(12) United States Patent
Seixeiro et al.

(10) Patent No.: US 10,528,228 B2
(45) Date of Patent: Jan. 7, 2020

(54) INTERACTION WITH NOTIFICATIONS ACROSS DEVICES WITH A DIGITAL ASSISTANT

(71) Applicant: Microsoft Technology Licensing, LLC, Redmond, WA (US)

(72) Inventors: Steve Seixeiro, Snohomish, WA (US); Gurpreet Virdi, Redmond, WA (US); Lijuan Qin, Redmond, WA (US); David Jeremy Guy Wood, Seattle, WA (US); Michael Burt Goulding, Redmond, WA (US); Lucas Scotta, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 71 days.

(21) Appl. No.: 15/629,450

(22) Filed: Jun. 21, 2017

(65) Prior Publication Data
US 2018/0373398 A1 Dec. 27, 2018

(51) Int. Cl.
*G06F 3/048* (2013.01)
*G06F 3/0482* (2013.01)
(Continued)

(52) U.S. Cl.
CPC ............ *G06F 3/0482* (2013.01); *G06F 3/167* (2013.01); *G06F 9/453* (2018.02);
(Continued)

(58) Field of Classification Search
CPC ...... G06F 3/016; G06F 3/0485; G06F 3/0488; G06F 3/04883
See application file for complete search history.

(56) References Cited

U.S. PATENT DOCUMENTS 6,141,754 A   10/2000   Choy
6,260,035 B1   7/2001   Horvitz et al.
(Continued)

FOREIGN PATENT DOCUMENTS

EP   1835417 A1   9/2007
EP   2043009 A1   4/2009
(Continued)

OTHER PUBLICATIONS

"Apple—iOS 7—Siri", Retrieved from: <<http://web.archive.org/web/20140314112139/http://www.apple.com/ios/siri/>>, Retrieved Date: Mar. 14, 2014, 3 Pages.
(Continued)

*Primary Examiner* — Linh K Pham
(74) *Attorney, Agent, or Firm* — Mark K. Young; Mayer & Williams PC

(57) ABSTRACT

A digital assistant supported on computing devices such as smartphones, tablet computers, personal computers (PCs), wearable devices, game consoles, smart home devices and the like is configured with a notification system that interfaces with applications and/or other systems and resources so that the digital assistant may collect notifications across a range of a user's devices. The digital assistant may utilize a natural language interface (which may cooperate with touch and gesture interfaces) and applies awareness of context and user's behaviors to intelligently present the collected notifications on a single device for the user as a native digital assistant user experience. The digital assistant can sort notifications, group notifications together, and interact with the user to answer questions, provide information and status, and enable the user to action on a notification from the collection.

19 Claims, 25 Drawing Sheets

(51) Int. Cl.
*H04L 29/08* (2006.01)
*G06F 3/16* (2006.01)
*G10L 15/18* (2013.01)
*G06F 9/451* (2018.01)
*G10L 15/22* (2006.01)
*G06F 3/0488* (2013.01)
*G06F 3/01* (2006.01)
*G10L 15/08* (2006.01)

(52) U.S. Cl.
CPC .......... *G10L 15/1815* (2013.01); *H04L 67/26* (2013.01); *H04L 67/306* (2013.01); *G06F 3/017* (2013.01); *G06F 3/04883* (2013.01); *G10L 15/22* (2013.01); *G10L 2015/088* (2013.01)

(56) References Cited

U.S. PATENT DOCUMENTS

| | | | |
|---|---|---|---|
| 6,377,913 B1 | 4/2002 | Coffman et al. | |
| 6,772,123 B2 | 8/2004 | Cooklev et al. | |
| 7,087,163 B2 | 8/2006 | Tubbs et al. | |
| 7,161,483 B2* | 1/2007 | Chung | H04L 12/2803 340/12.53 |
| 7,664,081 B2 | 2/2010 | Luoma et al. | |
| 7,716,492 B1 | 5/2010 | Saulpaugh et al. | |
| 7,873,654 B2 | 1/2011 | Bernard | |
| 7,987,163 B2 | 7/2011 | Keshavarz-Nia et al. | |
| 8,086,658 B2 | 12/2011 | Wagner et al. | |
| 8,131,718 B2 | 3/2012 | Tran | |
| 8,340,651 B1 | 12/2012 | Gailloux et al. | |
| 8,386,929 B2 | 2/2013 | Zaika et al. | |
| 8,417,233 B2 | 4/2013 | Woloshyn | |
| 8,493,888 B2 | 7/2013 | Palin et al. | |
| 8,560,400 B1 | 10/2013 | Lee | |
| 8,612,435 B2 | 12/2013 | Sambrani et al. | |
| 8,649,776 B2 | 2/2014 | Tofighbakhsh et al. | |
| 8,660,849 B2 | 2/2014 | Gruber et al. | |
| 8,930,191 B2 | 1/2015 | Gruber et al. | |
| 9,117,447 B2 | 8/2015 | Gruber et al. | |
| 9,235,978 B1 | 1/2016 | Charlton | |
| 9,318,108 B2 | 4/2016 | Gruber et al. | |
| 9,369,488 B2 | 6/2016 | Woods et al. | |
| 9,462,570 B1 | 10/2016 | Bostick et al. | |
| 9,473,944 B2 | 10/2016 | Cohen et al. | |
| 9,898,168 B2* | 2/2018 | Shapiro | G08B 25/14 |
| 2002/0129339 A1 | 9/2002 | Callahan et al. | |
| 2005/0097087 A1 | 5/2005 | Punaganti Venkata et al. | |
| 2005/0138173 A1 | 6/2005 | Ha et al. | |
| 2007/0083378 A1 | 4/2007 | Guarraci et al. | |
| 2007/0100790 A1 | 5/2007 | Cheyer et al. | |
| 2007/0141984 A1 | 6/2007 | Kuehnel et al. | |
| 2007/0264991 A1 | 11/2007 | Jones et al. | |
| 2008/0010344 A1* | 1/2008 | Wherry | H04L 51/04 709/204 |
| 2008/0313639 A1 | 12/2008 | Kumar et al. | |
| 2010/0009703 A1 | 1/2010 | Sornay | |
| 2010/0017853 A1 | 1/2010 | Readshaw | |
| 2010/0023865 A1* | 1/2010 | Fulker | G06F 3/04817 715/734 |
| 2010/0128126 A1* | 5/2010 | Takeuchi | G08B 13/1961 348/143 |
| 2010/0281427 A1 | 11/2010 | Ghosh et al. | |
| 2011/0074570 A1* | 3/2011 | Feldstein | H04L 12/2825 340/539.11 |
| 2011/0182205 A1 | 7/2011 | Gerdes et al. | |
| 2011/0302182 A1 | 12/2011 | Crawford | |
| 2012/0115453 A1 | 5/2012 | Zheng | |
| 2012/0117005 A1 | 5/2012 | Spivack | |
| 2012/0179742 A1* | 7/2012 | Acharya | H04N 7/18 709/202 |
| 2012/0210326 A1 | 8/2012 | Torr et al. | |
| 2012/0280790 A1* | 11/2012 | Gerhardt | G07C 9/00309 340/5.61 |
| 2012/0296955 A1 | 11/2012 | Schmidt et al. | |
| 2012/0309363 A1 | 12/2012 | Gruber et al. | |
| 2012/0316956 A1 | 12/2012 | Nath et al. | |
| 2012/0323794 A1 | 12/2012 | Livshits | |
| 2012/0324259 A1 | 12/2012 | Aasheim et al. | |
| 2013/0040615 A1 | 2/2013 | Sawhney et al. | |
| 2013/0057695 A1* | 3/2013 | Huisking | H04N 7/186 348/156 |
| 2013/0080184 A1 | 3/2013 | Streat et al. | |
| 2013/0097289 A1 | 4/2013 | Alsterlid et al. | |
| 2013/0159377 A1 | 6/2013 | Nash | |
| 2013/0244614 A1 | 9/2013 | Santamaria et al. | |
| 2013/0244636 A1 | 9/2013 | Shukla et al. | |
| 2013/0275164 A1 | 10/2013 | Gruber et al. | |
| 2014/0033204 A1 | 1/2014 | Dodge et al. | |
| 2014/0040171 A1 | 2/2014 | Segalov et al. | |
| 2014/0053260 A1 | 2/2014 | Gupta et al. | |
| 2014/0074483 A1 | 3/2014 | van os | |
| 2014/0108307 A1 | 4/2014 | Raghunathan et al. | |
| 2014/0122603 A1 | 5/2014 | Walsh | |
| 2014/0201647 A1 | 7/2014 | Scherpa et al. | |
| 2014/0222436 A1 | 8/2014 | Binder et al. | |
| 2014/0241540 A1* | 8/2014 | Hodges | H04M 1/6066 381/74 |
| 2014/0244744 A1 | 8/2014 | Lyren | |
| 2014/0337028 A1* | 11/2014 | Wang | H04M 1/6075 704/251 |
| 2014/0372429 A1 | 12/2014 | Ziklik et al. | |
| 2015/0100890 A1 | 4/2015 | Kosmiskas et al. | |
| 2015/0245216 A1 | 8/2015 | Cohen et al. | |
| 2015/0373144 A1 | 12/2015 | Cohen et al. | |
| 2016/0164810 A1 | 6/2016 | Wolz et al. | |
| 2017/0075737 A1* | 3/2017 | Kim | G06F 9/542 |
| 2017/0105190 A1* | 4/2017 | Logan | H04W 68/00 |
| 2017/0134698 A1* | 5/2017 | Mahar | H04N 7/181 |
| 2017/0244798 A1* | 8/2017 | DeLuca | H04L 67/26 |
| 2017/0302800 A1* | 10/2017 | Schultz | H04M 3/53383 |
| 2018/0082343 A1* | 3/2018 | Gordon | G06Q 30/0279 |
| 2018/0131802 A1* | 5/2018 | Cho | H04M 1/72519 |
| 2018/0206083 A1* | 7/2018 | Kumar | H04W 4/12 |
| 2018/0211301 A1* | 7/2018 | Davies | G06Q 30/0621 |
| 2018/0232976 A1* | 8/2018 | Schoenfelder | G07C 9/00111 |
| 2018/0367670 A1* | 12/2018 | Kazerani | G06N 5/046 |

FOREIGN PATENT DOCUMENTS

| | | |
|---|---|---|
| WO | 0145005 A1 | 6/2001 |
| WO | 2009021265 A1 | 2/2009 |
| WO | 2012112404 A2 | 8/2012 |
| WO | 2016054230 A1 | 4/2016 |
| WO | 2016085776 A1 | 6/2016 |

OTHER PUBLICATIONS

"Bluetooth Specification- Phone Book Access Profile (PBAP) V10ROO", In Proceedings of the Volume PBAP SPEC, No. V10rOO, Apr. 27, 2006, 41 Pages.

"Core Bluetooth Programming Guide", Retrieved from: <<https://developer.apple.com/library/ios/documentation/NetworkingInternetWeb/Conceptual/CoreBluetooth_concepts/CoreBluetoothBackgroundProcessingForIOSApps/PerformingTasksWhileYourAppIsInTheBackground.html>>, Retrieved Date: Mar. 11, 2014, 7 Pages.

"IOS App Programming Guide", In iOS App Programming Guide, Apple Incorporation, Oct. 23, 2013, 11 Pages.

"Sherpa, Superior Intelligent Personal Assistant", Published in Business Wire, A Berkshire Hathaway Company, Apr. 17, 2013, 4 Pages.

"Final Office Action Issued in U.S. Appl. No. 14/187,567", dated Mar. 21, 2016, 13 Pages.

"Non Final Office Action Issued in U.S. Appl. No. 14/187,567", dated Jul. 21, 2015, 17 Pages.

"Notice of Allowance Issued in U.S. Appl. No. 14/187,567", dated Jun. 15, 2016, 9 Pages.

"Final Office Action Issued in U.S. Appl. No. 14/219,501", dated Feb. 27, 2017, 9 Pages.

(56) References Cited

OTHER PUBLICATIONS

"Non Final Office Action Issued in U.S. Appl. No. 14/219,501", dated Nov. 5, 2015, 10 Pages.
"Non Final Office Action Issued in U.S. Appl. No. 14/219,501", dated Jul. 15, 2016, 12 Pages.
"Non Final Office Action Issued in U.S. Appl. No. 14/265,656", dated Mar. 31, 2016, 16 Pages.
"Notice of Allowance Issued in U.S. Appl. No. 14/265,656", dated Oct. 5, 2016, 15 Pages.
"Notice of Allowance Issued in U.S. Appl. No. 14/265,882", dated Aug. 14, 2015, 10 Pages.
"Non Final Office Action Issued in U.S. Appl. No. 14/274,650", dated Oct. 2, 2015, 11 Pages.
"Notice of Allowance Issued in U.S. Appl. No. 14/274,650", dated Apr. 29, 2016, 8 Pages.
"Non Final Office Action Issued in U.S. Appl. No. 15/233,893", dated Feb. 27, 2017, 18 Pages.
Botla, Purushotham, "Designing Personal Assistant Software for Task Management Using Semantic Web Technologies and Knowledge Databases", In Working Paper CISL, May 20, 2013, 112 Pages.
Gil, et al., "Towards Intelligent Assistance for To-Do Lists", In Proceedings of the 13th International Conference on Intelligent user Interfaces, Jan. 13, 2008, 4 Pages.
Johnson, et al., "Hyundai's Second Generation Blue Link Technology Now Powered by Google and Provides Intelligent Assistance" In Hyundai Press Release, Jan. 6, 2014, 4 Pages.
Khutade, et al., "QOS Based Web Service Discovery Using OO Concepts", In Proceedings of the International Journal of Advanced Technology & Engineering Research (IJATER), vol. 2, Issue 6, Nov. 2012, pp. 81-86.
Koch, et al., "Classification of Agents-based Mobile Assistants", In Proceedings of the Aamas Workshop on Agents for Ubiquitous Computing, Jun. 2004, 12 Pages.
Lee, Joel, "5 Free Siri Alternatives for Android—Which is the Best?", Retrieved from: <<http://www.makeuseof.com/tag/5-free-siri-alternatives-for-android-which-is-the-best/>>, Jan. 15, 2013, 7 Pages.
Lugano, et al., "To Share or Not to Share: Supporting the User Decision in Mobile Social Software Applications", In Proceedings of 11th International Conference on User Modeling, Jul. 25, 2007, pp. 440-444.
Oaks, et al., "Capabilities: Describing What Services Can Do", In Proceedings of 1st International Conference on Service-Oriented Computing, vol. 2910, Jan. 1, 2003, 16 Pages.
Papazoglou, et al., "Service-Oriented Computing", In Communications of the ACM, vol. 46, Issue 10, Oct. 2003, 4 Pages.
"International Preliminary Report on Patentability Issued in PCT Application No. PCT/US2015/016726", dated Apr. 18, 2016, 8 Pages.
"International Search Report and Written Opinion Issued in PCT Application No. PCT/US2015/016726", dated May 6, 2015, 11 Pages.
"Second Written Opinion Issued in PCT Application No. PCT/US2015/016726", dated Aug. 12, 2015, 5 Pages.
"International Preliminary Report on Patentability Issued in PCT Application No. PCT/US2015/016727", dated Feb. 11, 2016, 7 Pages.
"International Search Report and Written Opinion Issued in PCT Application No. PCT/US2015/016727", dated May 21, 2015, 9 Pages.
"Second Written Opinion Issued in PCT Application No. PCT/US2015/016727", dated Nov. 17, 2015, 5 Pages.
"International Preliminary Report on Patentability Issued in PCT Application No. PCT/US2015/016728", dated Apr. 20, 2016, 7 Pages.
"International Search Report and Written Opinion Issued in PCT Application No. PCT/US2015/016728", dated May 18, 2015, 10 Pages.
"Second Written Opinion Issued in PCT Application No. PCT/US2015/016728", dated Dec. 9, 2015, 6 Pages.
"International Preliminary Report on Patentability Issued in PCT Application No. PCT/US2015/016729", dated Apr. 18, 2016, 7 Pages.
"International Search Report and Written Opinion Issued in PCT Patent Application No. PCT/US2015/016729", dated May 20, 2015, 9 Pages.
"Second Written Opinion Issued in PCT Application No. PCT/US2015/016729", dated Jan. 14, 2016, 5 Pages.
"International Preliminary Report on Patentability Issued in PCT Application No. PCT/US2015/027406", dated Mar. 29, 2016, 6 Pages.
"International Search Report and Written Opinion Issued in PCT Patent Application No. PCT/US2015/027406", dated Jul. 7, 2015, 9 Pages.
Pokraev, et al., "Extending UDDL with Context-Aware Features Based on Semantic Service Descriptions", In Proceedings of the International Conference on Web Services, Jun. 23, 2003, 7 Pages.
Ra, et al., "Improving Energy Efficiency of Personal Sensing Applications with Heterogeneous Multi-Processors", In Proceedings of the ACM Conference on Ubiquitous Computing, Sep. 5, 2012, 10 Pages.
Raverdy, et al., "Efficient Context-Aware Service Discovery in Multi-Protocol Pervasive Environments", In Proceedings of the 7th International Conference on Mobile Data Management, May 10, 2006, 8 Pages.
Rompothong, et al., "A Query Federation of UDDI Registries", In Proceedings of the 1st International Symposium on Information and Communication Technologies, Sep. 24, 2003, pp. 561-566.
Stakic, et al., "Design Issues in Minimizing Infrastructure Requirements of Mobile Social Software Introduction System", In Proceedings of the IEEE Third International Conference on Social Computing, Privacy, Security, Risk and Trust (PASSAT), Oct. 9, 2011, pp. 583-586.
Tian, et al., "Web Service Discovery with UDDI Based on Semantic Similarity of Service Properties", In Proceedings of the Third International Conference on Semantics, Knowledge and Grid, Oct. 29, 2007, pp. 454-457.
Yorke-Smith, et al., "Like an Intuitive and Courteous Butler: A Proactive Personal Agent for Task Management", In Proceedings of 8th International Joint Conference on Autonomous Agents and Multiagent Systems, May 10, 2009, pp. 337-344.

\* cited by examiner

Conversation
Actions

105 — (user)

1005 — Hey Cortana, what did I miss?

110 (phone) 112 — Digital assistant

1010 — Digital assistant analyzes available context

1015 — You received 6 email messages on your office PC, 3 messages on your game console, and 4 notifications from social media applications on your home laptop.

1020 — Thanks Cortana. Did Michael send any of them?

1025 — Yes, Michael sent an email and 2 game messages, and posted 3 times on different social media applications.

1030 — Okay, please show just the messages from Michael now.

1035 — Digital assistant displays notifications by group on user's device

Thanks Cortana.

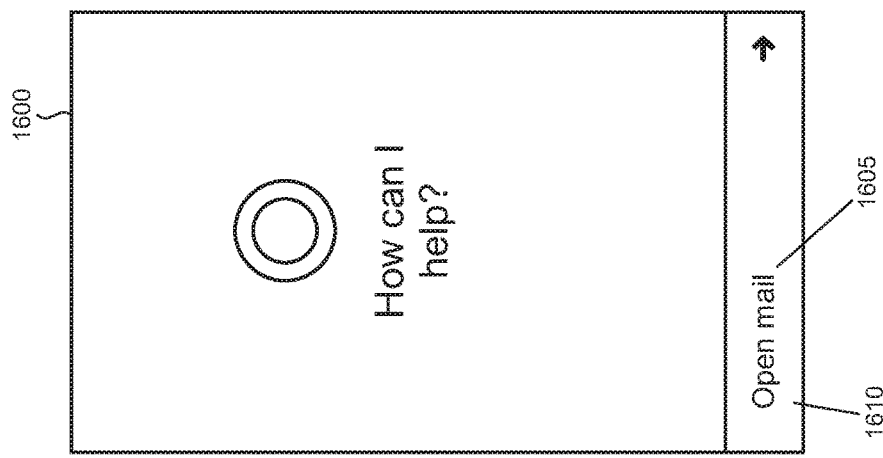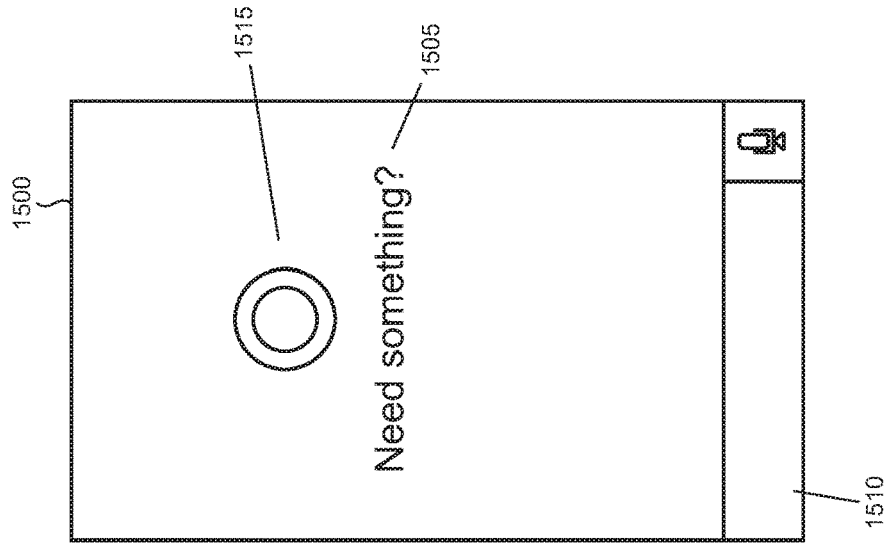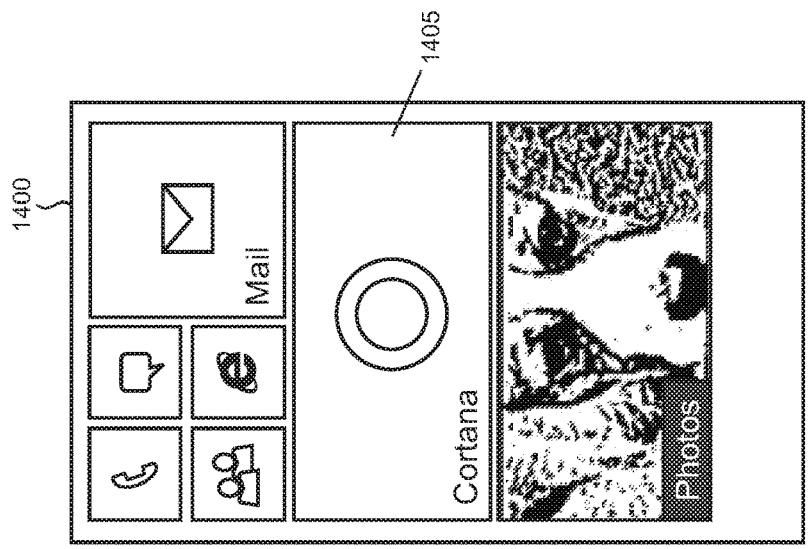

INTERACTION WITH NOTIFICATIONS ACROSS DEVICES WITH A DIGITAL ASSISTANT

BACKGROUND

Digital assistants can provide a variety of features for device users and can make it easier to interact with devices to perform tasks, get information, and stay connected with friends and colleagues using voice interactions and other inputs. Digital assistants are sometimes referred to as "virtual assistants."

This Background is provided to introduce a brief context for the Summary and Detailed Description that follow. This Background is not intended to be an aid in determining the scope of the claimed subject matter nor be viewed as limiting the claimed subject matter to implementations that solve any or all of the disadvantages or problems presented above.

SUMMARY

A digital assistant supported on computing devices such as smartphones, tablet computers, personal computers (PCs), wearable devices, game consoles, connected car devices, virtual and mixed reality devices, smart home devices, and the like is configured with a notification system that interfaces with applications and/or other systems and resources so that the digital assistant may collect notifications across a range of a user's devices. The digital assistant may utilize a natural language interface (which may cooperate with touch and gesture interfaces) and applies awareness of context and user's behaviors to intelligently present the collected notifications on a single device for the user as a native digital assistant user experience. The digital assistant can filter and sort notifications according to various criteria (e.g., by priority, sender, or application), group notifications together, and interact with the user to answer questions, provide information and status, and enable the user to action on a notification from the collection. By providing a comprehensive single view of notifications across all of the user's devices, the functionality of the digital assistant is thereby enhanced to provide meaningful and contextually-relevant information on a device at a time of the user's choosing, while saving the user time and effort.

The digital assistant's collection and intelligent presentation of notifications on a single one of the user's devices enables increased user efficiency when sorting through the myriad of notifications that are presented across devices through the typical course of the day. The digital assistant provides a consistent user interface to manage disparate notifications and may improve overall user interaction performance with the device. Such improved user interaction performance may enable the device to more efficiently utilize available computing resources including network bandwidth, processing cycles, memory, and battery life.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Furthermore, the claimed subject matter is not limited to implementations that solve any or all disadvantages noted in any part of this disclosure. It will be appreciated that the above-described subject matter may be implemented as a computer-controlled apparatus, a computer process, a computing system, or as an article of manufacture such as one or more computer-readable storage media. These and various other features will be apparent from a reading of the following Detailed Description and a review of the associated drawings.

DESCRIPTION OF THE DRAWINGS

FIGS. 6, 7, and 10-12 show respective transcripts of interactions with notifications across devices with a digital assistant;

FIGS. 14, 15, and 16 show screen captures of illustrative GUIs that are exposed on a device by a digital assistant;

Like reference numerals indicate like elements in the drawings. Elements are not drawn to scale unless otherwise indicated.

DETAILED DESCRIPTION

Figure 1:
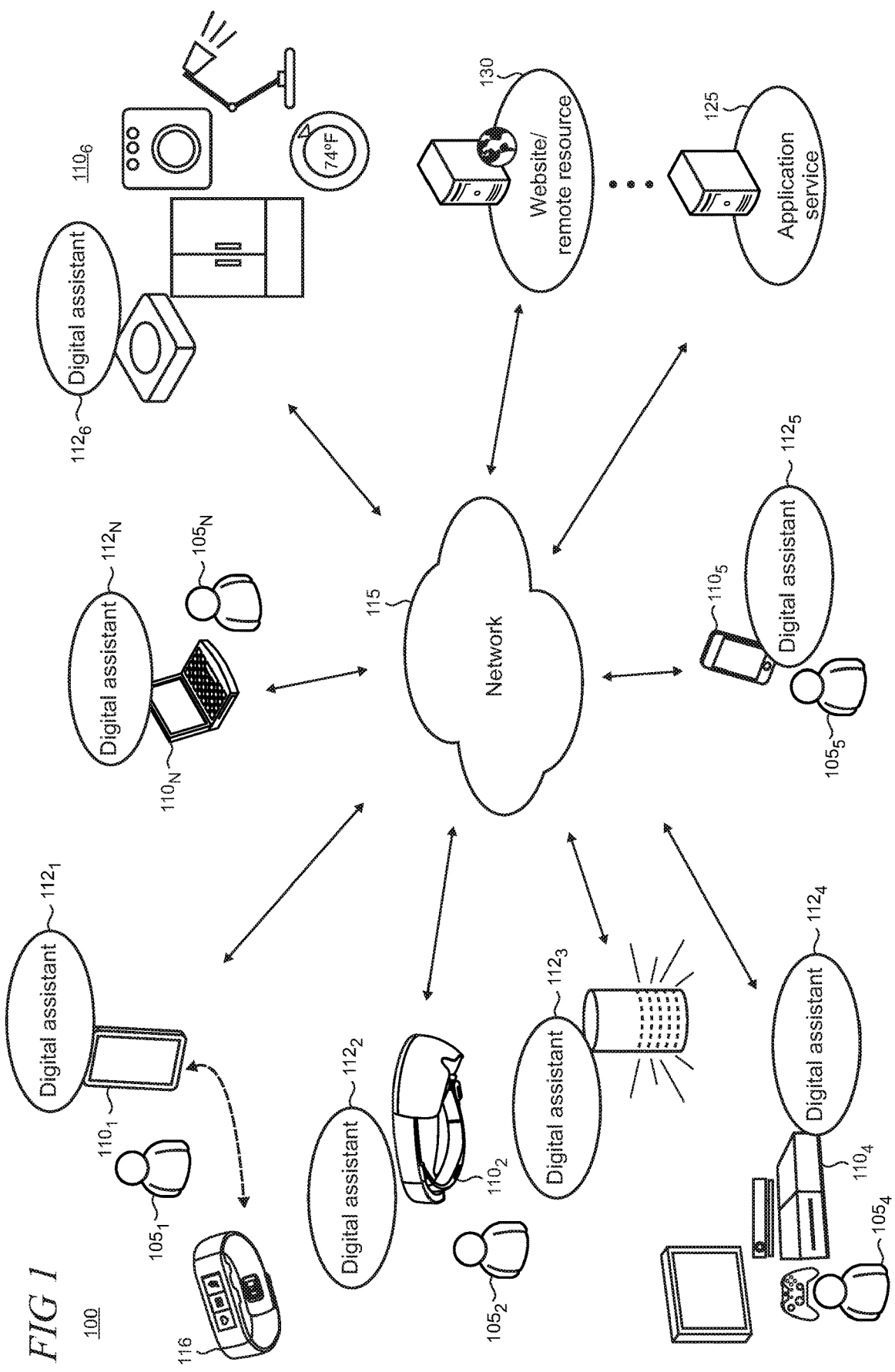
FIG. 1 shows an illustrative environment in which computing devices can communicate and interact with application services and websites over a network.

Multiple different computing devices are often associated with the same identity, account, or user. For example, a user may sign onto a tablet computer at home while reading the news at breakfast, employ a map application on a smartphone to navigate around a road closure on the way to work, and then log in to a PC at the office. Each device may receive numerous notifications per day. As used herein, the term "notification" is broadly defined as information that is sent to and received on a device and which is typically exposed (i.e., surfaced, conveyed, rendered, presented, or displayed) in the form of an alert or message, typically through a user interface (UI) element on a device using, for example, graphics, text, audio, animations, or combinations thereof.

Notifications can comprise audio, haptics, and graphic objects such as pop-ups, balloons, windows, icons, and banners that are presented on a device to communicate information to a device user that are typically unrelated to a current user activity. Notifications do not usually present critical information and thus do not require immediate user attention. Notifications can include a variety of types and be associated, for example, with applications, systems, events, people, and places. For example, notifications can include or relate to messages from device users (e.g., friends, family, colleagues) and entities (e.g., service providers, stores), replies, likes, news, emergency information, weather alerts, social media activities (e.g., new post, new picture, friend request), device state (e.g., memory full, battery low), and so on. Notifications may alert the device user as to the availability of information (e.g., "you have a new email message") and may also include the content itself (e.g., "the stock market is up 2.1% at today's close").

Notifications can be implemented in variety of ways, for example, using over-the-top (OTT) services such as SMS (short message service) messaging, system-based services such as push notification services, or integrated within a given application-based user experience. Notifications can be configured to be actionable by a user and may suggest performance of an action that can often be accessed by interacting with the notification in some way (e.g., clicking on the notification or a control exposed by the notification).

A user may utilize different devices in different settings and contexts and at different times and locations. For example, a user may have personal preferences to receive notifications on a multimedia console dealing with a user's game activities but may not view them as appropriate for the user's work computer. Work policies may dictate device use as well. For example, access to email and resources may be restricted on some mobile devices for security and other reasons. Some notifications are temporal in nature such as those dealing with a weather event or traffic conditions.

In some situations, technical platform differences may make some types of notifications suitable for a particular device while being less so for others. For example, a user may find that a notification to a small screen smartwatch about the availability of a new video is not very useful. Some notifications may also be considered device-specific (e.g., a low battery notification). The variety of notifications that are supported on different devices at different times can be overwhelming to the user which can lead to notifications being missed, or the user having to sort through notifications on several devices to find a specific notification of interest.

Turning now to the drawings, FIG. 1 shows an illustrative environment 100 in which the same or different users 105 may employ various devices 110 that communicate over a network 115. Each device 110 may include an instance of an embedded digital assistant 112 or be coupled to another device that includes a digital assistant. The devices 110 can support voice telephony capabilities in some cases and typically support data-consuming applications such as Internet browsing and multimedia (e.g., music, video, etc.) consumption in addition to various other features. The devices 110 may include, for example, user equipment, mobile phones, cell phones, feature phones, tablet computers, and smartphones which users often employ to make and receive voice and/or multimedia (i.e., video) calls, engage in messaging (e.g., texting) and email communications, use applications and access services that employ data, browse the World Wide Web, and the like.

Other types of electronic devices may also be usable within the environment 100 including handheld computing devices, PDAs (personal digital assistants), portable media players, devices that use headsets and earphones (e.g., Bluetooth-compatible devices), phablet devices (i.e., combination smartphone/tablet devices), wearable computing devices such as head-mounted display (HMD) systems and smartwatches, navigation devices such as GPS (Global Positioning System) systems, laptop PCs (personal computers), smart speakers, IoT (Internet of Things) devices, smart appliances, connected car devices, smart home hubs and controllers, desktop computers, multimedia consoles, gaming systems, or the like. In the discussion that follows, the use of the term "device" is intended to cover all devices that are configured with an embedded digital assistant (or can connect to a device with a digital assistant), have communication capabilities, and are capable of connectivity to the communications network 115.

The various devices 110 in the environment 100 can support different features, functionalities, and capabilities (here referred to generally as "features"). Some of the features supported on a given device can be similar to those supported on others, while other features may be unique to a given device. The degree of overlap and/or distinctiveness among features supported on the various devices 110 can vary by implementation. For example, some devices 110 can support touch controls, gesture recognition, and voice commands, while others may enable a more limited user interface. Some devices may support video consumption and Internet browsing, while other devices may support more limited media handling and network interface features.

Accessory devices 116, such as wristbands and other wearable computing devices may also be present in the environment 100. Such accessory device 116 typically is adapted to interoperate with a coupled device 110 using a short range communication protocol like Bluetooth to support functions such as monitoring of the wearer's physiology (e.g., heart rate, steps taken, calories burned, etc.) and environmental conditions (temperature, humidity, ultra-violet (UV) levels, etc.), and surfacing notifications from the coupled device 110. Some accessory devices can be configured to work on a standalone basis (i.e., without relying on a coupled device 110 for functionality such as Internet connectivity) as wearable computing devices that may support an operating system and applications.

The devices 110 can typically utilize the network 115 in order to access and/or implement various user experiences. The network can include any of a variety of network types and network infrastructure in various combinations or sub-combinations including cellular networks, satellite networks, IP (Internet-Protocol) networks such as Wi-Fi under IEEE 802.11 and Ethernet networks under IEEE 802.3, a public switched telephone network (PSTN), and/or short range networks such as Bluetooth® networks. The network infrastructure can be supported, for example, by mobile operators, enterprises, Internet service providers (ISPs), telephone service providers, data service providers, and the like.

The network 115 may utilize portions of the Internet (not shown) or include interfaces that support a connection to the Internet so that the devices 110 can access content and render user experiences provided by various remote or cloud-based application services 125 and websites 130. The application services 125 and websites 130 can support a diversity of features, services, and user experiences such as social networking, mapping, news and information, entertainment, travel, productivity, finance, etc.

Figure 2:
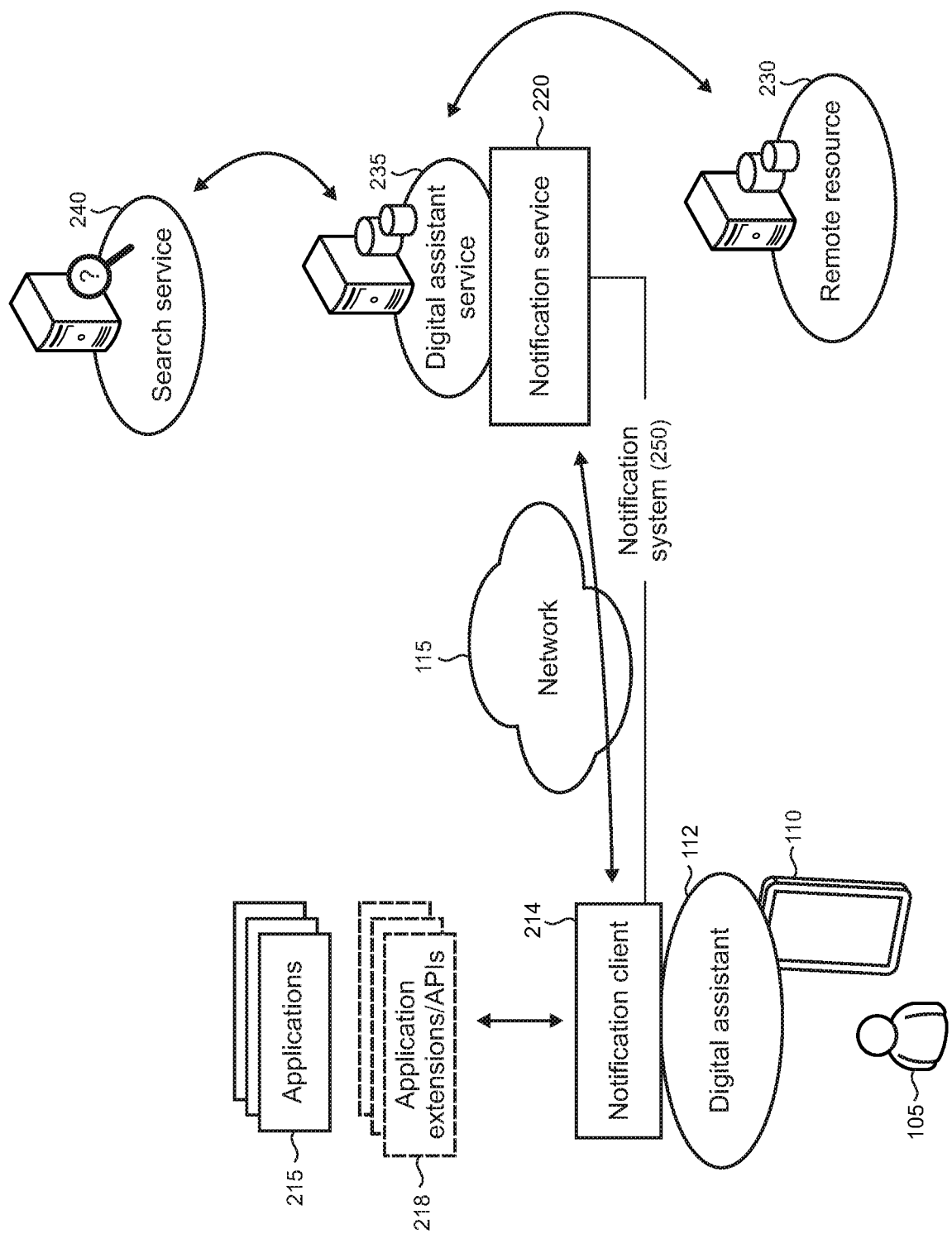
FIG. 2 shows an illustrative local notification client interacting with a remote notification service.

As shown in FIG. 2, a device 110 can include local components such as one or more applications 215 and/or a browser (not shown) that can respectively facilitate interaction with one or more websites 130 (FIG. 1) and remote application services 125. For example, in some use scenarios, a user 105 may launch a locally executing application that communicates over the network 115 to an application service 125 (FIG. 1) to retrieve data and obtain services to enable various features and functions, provide information, and/or support user experiences that can be supported on various ones of the user interfaces on a local device 110 such as graphical user interfaces (GUIs), natural language interfaces, and audio interfaces. In some use scenarios and/or at different times, an application 215 may operate locally on the device without needing to interface with a remote service.

In this illustrative example, the local digital assistant 112 interoperates with a local notification client 214 that typically communicates over the network 115 with a remote notification service 220 that is supported by a remote digital assistant service 235. The notification client 214 is configured to interact with applications 215. The interactions can include listening for and collecting notifications that are generated by the applications or are otherwise associated with the applications. In some implementations, the interactions may be facilitated by extensions to the applications or APIs (application programming interfaces), as indicated by reference numeral 218. Such extensions and APIs are optional, as indicated by the dashed line around element 218, and may be suitably configured to enable more comprehensive and programmatic interactions between the digital assistant and application which may be desirable in some scenarios.

In this particular example, the notification client 214 is configured to interact with the digital assistant 112, and the notification service 220 is supported by the digital assistant service 235. However, the notification client can be separately instantiated from the digital assistant in some cases. In addition, the notification service 220 may be optionally provided in whole or part by a standalone service or be incorporated into another service.

The notification client 214 and service 220 form a notification system 250. The split of functionality between client 214 and service 220 can be set to meet the needs of a given implementation. The utilization of a client-server architecture to implement the notification system 250 in this implementation is a design choice and other architectures may also be utilized. For example, the notification system can be executed using fully locally instantiated components in some cases, or executed completely remotely in other cases. In some implementations, the notification client 214 can be arranged as a standalone component that provides features and/or services without interacting with a remote resource or service (aside from periodic updates, and the like). Typically, the interoperability between the notification system 250 and digital assistant 112 is implemented so that the notification system can render user experiences, features, and content using the digital assistant with a similar and consistent sound, look, and feel in most cases so that transitions between the notification system and the digital assistant are handled smoothly and the experiences are rendered seamlessly to the user.

The digital assistant service 235 may interoperate with a search service 240 and other remote resources 230 to provide digital assistant functionality as described in more detail in the text accompany FIGS. 13-19 below.

Figure 3:
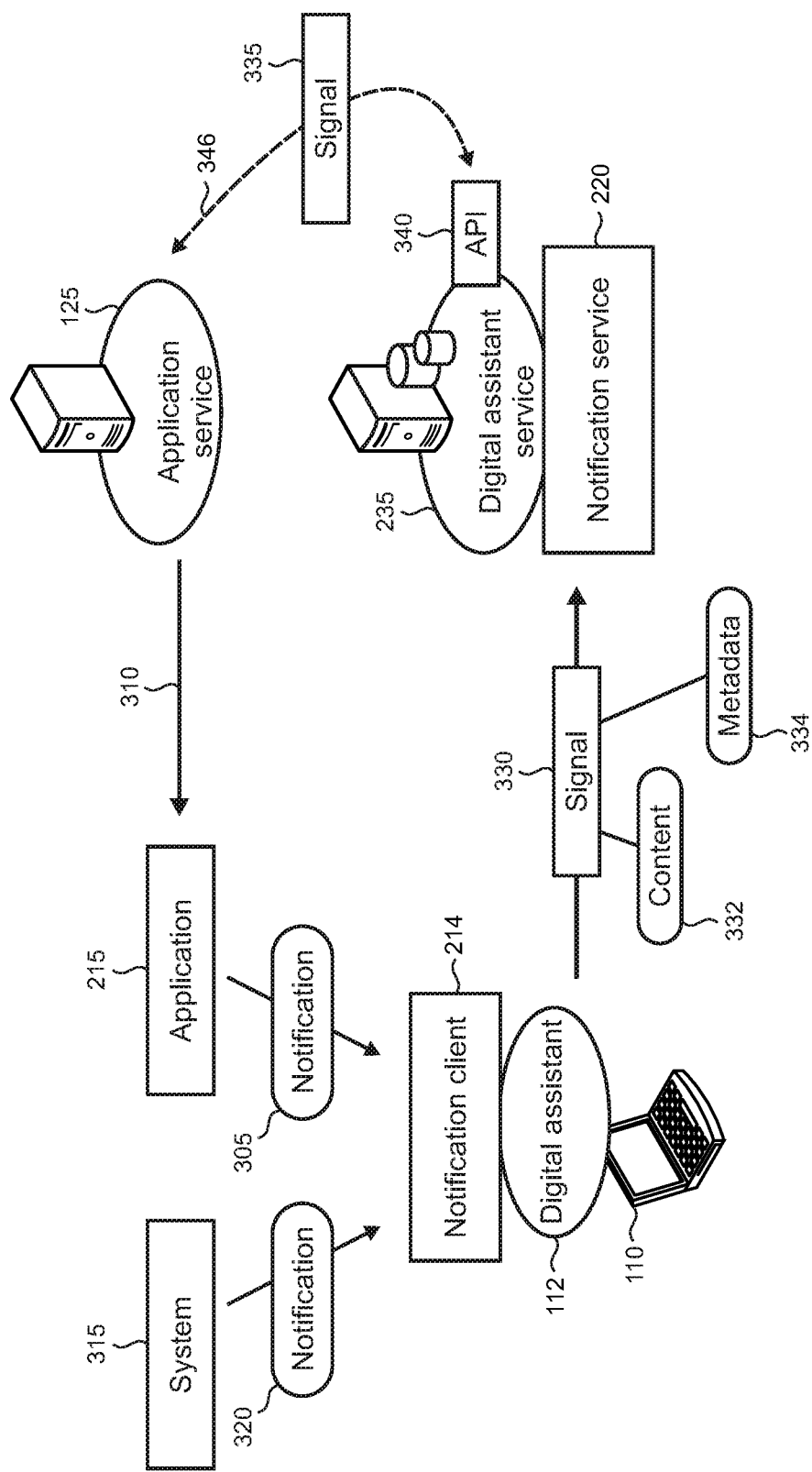
FIG. 3 shows an illustrative collection of notifications at a representative device in which the client provides notification signals to the service.

FIG. 3 shows an illustrative scenario in which the notification client 214 collects a notification 305 associated with an application 215. For example, the application may be a social media application and the notification could serve to alert the user of a new posting by a friend. In this exemplary scenario, the local application 215 communicates with the remote application service 125, as indicated by line 310, to expose or surface the notification on the device 110. A notification can also be exposed using local actions on the device. As shown, a locally executing process or system 315 (e.g., performed by the operating system on the device) may also expose a notification 320 on the device that is collected by the client 214. For example, notification 320 may be a system message dealing with state of a local device 110 such battery charge level, lost network connection, etc.

The digital assistant 112 sends signals representing the notifications to the notification service 220, as representatively indicted by reference numeral 330. A notification signal can include content 332 associated with a given notification, along with metadata 334 in some cases, that the notification system can utilize, for example, when filtering and/or sorting notifications and interacting with the user (e.g., answering questions and actioning on notifications). The notification content enables the system to recreate and expose the collected notifications on a device and time of the user's choosing. The metadata can include, for example, context associated with the notification such as time of notification, application associated with the notification, device on which the notification is surfaced, device location and/or state, and other suitable and/or related data or information that may facilitate the filtering, provision of information to the user, and actioning. Signals can include other suitable data and data types beyond content and metadata to meet various design criteria and implementation requirements.

In an alternative scenario, service-to-service communications may also be utilized in which the application service 125 provides notification signals 335 to the digital assistant service 235 through an API 340, for example, or another suitable interface. This communication path is optionally utilized as indicated by the dashed line 346 and may facilitate the application service providing notifications including content and metadata and other data that may be used to enhance a given user experience. Service-to-service communications may be utilized to supplement the notification signals from the client 214 in some cases, or replace them in other cases.

Figure 4:
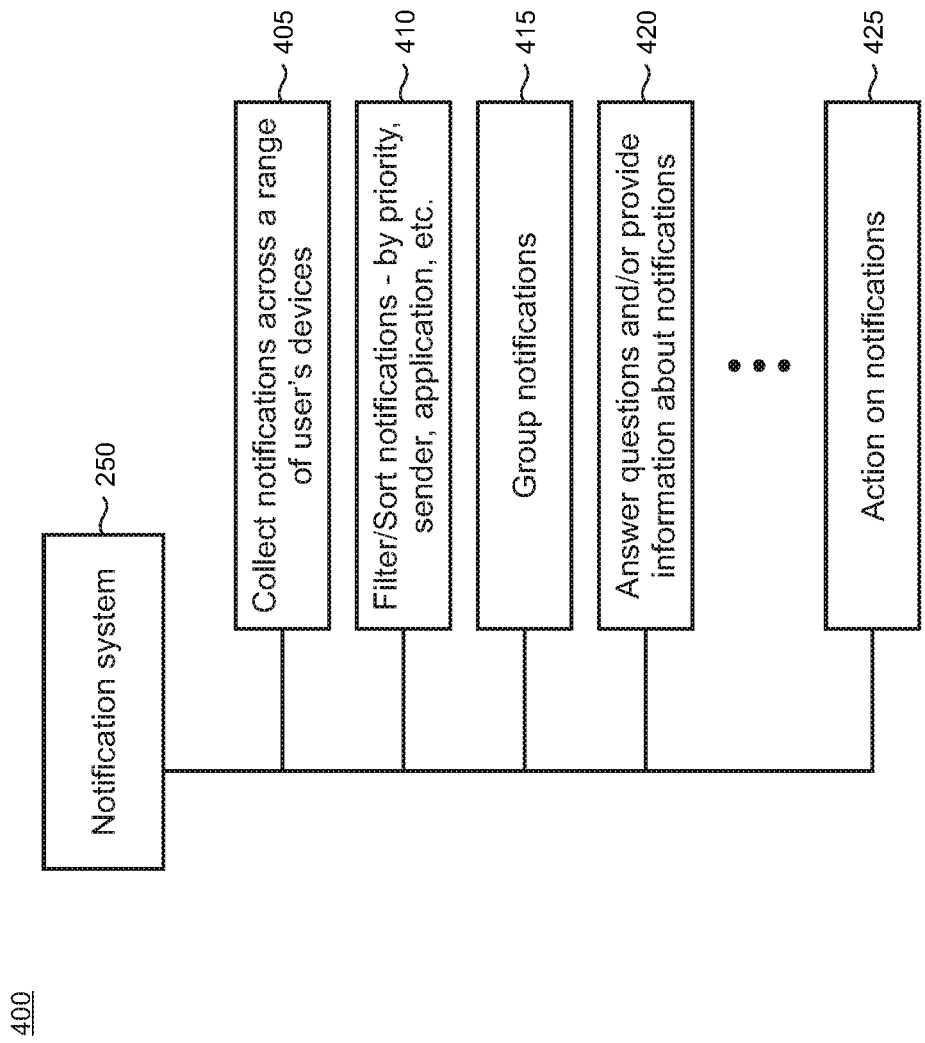
FIG. 4 shows an illustrative taxonomy of functionalities supported by a notification system.

FIG. 4 shows an illustrative taxonomy 400 of functionalities that may be utilized in a given implementation of the present interaction with notifications across devices with a digital assistant. The functionalities are illustrative and not exhaustive and not every functionality needs to be supported in every implementation. The functionalities include the notification system 250 collecting notifications across a range of the user's devices, as indicated by reference numeral 405. The notification collection may be performed across all of the user's devices 110, or a subset of devices. In some cases, a UI (e.g., a GUI, natural language UI, or other UIs that may facilitate interactions with touch and/or gestures) may be supported by the notification system that is configured to enable the user to select the particular devices from which notifications are collected or set preferences for collection. In other cases, the system can automatically select devices in the collection group or make suggestions to the user for group membership. The selection can be dynamic and devices can be added and deleted from a notification collection group as appropriate based on user preferences, sign-in status, device state (e.g., power on/off), current device capabilities (e.g., connected/disconnected from a network), relevant context, and so forth.

The notification system 250 may be configured to filter or sort notifications (410) using a variety of criteria. For example, the digital assistant can apply intelligence to analyze available context to determine priority or importance and then expose collected notifications that meet a priority threshold. The user can explicitly control filtering and sorting through a UI, for example to set notification priority and thresholds, allow or suppress notifications from certain devices or people (e.g., create white lists and black lists), select the applicable context for collected notifications to be exposed (e.g., suppress notifications when the user is driving, on the phone, or in a meeting, enable notifications from family members at all times, suppress notifications originated at a game console when the user is at work, etc.), and the like. Filtering and sorting control can also be implemented through user interactions with the digital assistant using voice, text, or gestures in some situations.

The user can also implicitly control filtering and sorting by enabling the digital assistant to monitor user interactions with applications on the various devices 110 (in which such monitoring is performed with notice to the user and user consent). The monitored interactions can enable the digital assistant to learn the user's preferences for collecting and surfacing notifications. For example, the digital assistant may observe a recurring pattern in which the user requests that the collected notifications be suppressed from surfacing when the user attends scheduled meetings or is exercising. The digital assistant can thus suggest to the user that such notification system behavior be used in the future in similar contexts. Feedback from the user on the appropriateness or relevance of the suggested behavior can be collected by the digital assistant service 235 (or another service) and be used to refine the methodology utilized to collect and expose notifications.

The notification system 250 may be further configured to group notifications (415) from within the collection. For example, the system can group notifications from the same sender that are exposed on different devices by different applications. The criteria used for grouping can vary by implementation and both explicit and implicit user control over grouping can be supported through user interactions with the digital assistant or a suitable UI, or by monitoring user interactions (with notice to the user and consent).

Grouping provides another beneficial way for a user to exercise control over notifications and can reduce user effort to locate and consume sought-after information. The digital assistant can identify and create groups using the notification metadata 334 and content 332. The digital assistant can be configured in some implementations to analyze available contextual data and user interactions to make inferences about groups and populate the groups with appropriate notifications. The digital assistant can suggest groups to the user, for example, through natural language interactions or other UI interactions. Feedback from the user on the appropriateness or relevance of the suggested group can also be collected by the digital assistant service 235 (or another service) and be used to refine the methodology utilized to identify and create groups.

The notification system 250 may be further configured to answer questions and/or provide information about notifications in the collection to the user (420). Typically, the user will query the digital assistant using the natural language UI, but queries can also be input to the digital assistant using text-based, gesture-based, and other suitable UIs. The digital assistant can answer questions and provide information about the collected notifications as a group, individual notifications, content within the notifications, or about topics that may be associated with the notifications and/or related data.

The aggregated notification signals provide the digital assistant with the capability to provide a variety of information to the user with different scope—from a quick summary of notifications to a comprehensive and detailed breakdown of information. For example, the user may query the digital assistant in broad terms about the collected notifications and then drill down with specific questions about notifications of specific interest. The digital assistant's awareness of context and user behaviors and interactions may further enable accurate and rich information to be imparted so that the user can efficiently catch up on activities, events, and status across a range of devices at a time of the user's choosing.

The notification system 250 may be further configured to action on notifications (425) from the collection of notifications. Actions can have broad scope and effect across different devices, applications, and users. The actioning functionality may include the digital assistant itself taking an action on a notification or related data/information, or the digital assistant facilitating an action taken by the user, the operating system, or application with regard to a given notification or related data. For example, the digital assistant can reply to a notification in an SMS message about a new social media post from the user's friend. Other digital assistant actions are described in the text accompanying FIG. 13 below.

Figure 5:
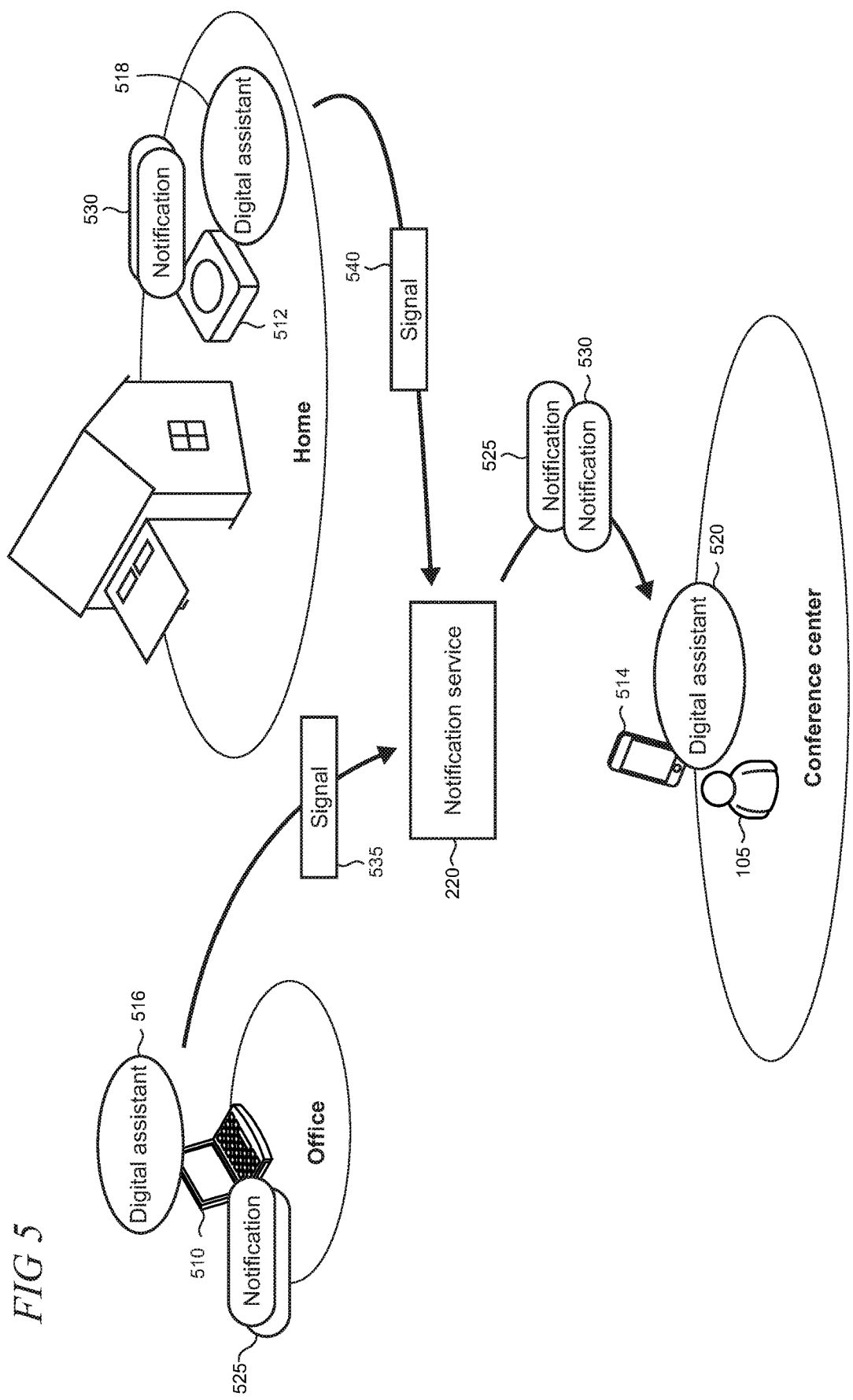
FIG. 5 shows an illustrative use scenario in which notifications are collected across devices and exposed using a single view on a device for a user.

FIG. 5 shows an illustrative use scenario in which a user 105 has signed in to three different devices including an office laptop 510, smart home hub 512, and a smartphone 514 that the user is currently using while attending a meeting at a conference center. An instance of a digital assistant is embedded in each device, as respectively indicated by reference numerals 516, 518, and 520. As notifications are received or generated on the laptop and smart home hub (representatively and respectively indicated by reference numerals 525 and 530), respective signals 535 and 540 are generated by the notification client (not shown) and passed to the notification service 220.

The notification service 220 can aggregate the signals which, as described above, are configured to enable the notifications that are collected at the laptop and hub devices to be forwarded and/or stored. Such storage can be implemented locally, remotely in the cloud, or using a combination of local and remote storage. Notifications may thus be persisted to extend their life beyond that which is typically supported on a given device. In addition, collected notifications can be archived, retrieved, and shared as with other durable content such as messages, emails, and documents. With notice to users and consent, collected notifications may also be data-mined and analyzed on an individual user basis, or across populations of users, for example, to identify trends and improve notification collection behaviors, recommendation methodologies, and overall performance of the notification system.

Interacting with the digital assistant and/or utilizing another suitable UI, the user 105 can enable the notification service 220 to forward notifications on the office laptop 510 and smart home hub 512 to the smartphone 514 at the conference center synchronously with their receipt or generation on those devices. For example, the user may wish to keep up with notifications across the remote devices as they dynamically occur in real time. The user may also choose to suppress synchronous surfacing behavior for notifications and instead utilize an asynchronous or on-demand surfacing of collected notifications. Here, the collected notifications are surfaced on the smartphone 514 when the user makes a request. Notifications can also be provided to the user at a pre-set time (e.g., 3 pm today) or upon an occurrence of an event (e.g., the user leaves the conference center) that the notification service can detect through monitoring of context or user behaviors or from device sensors or using other suitable techniques.

Figure 6:
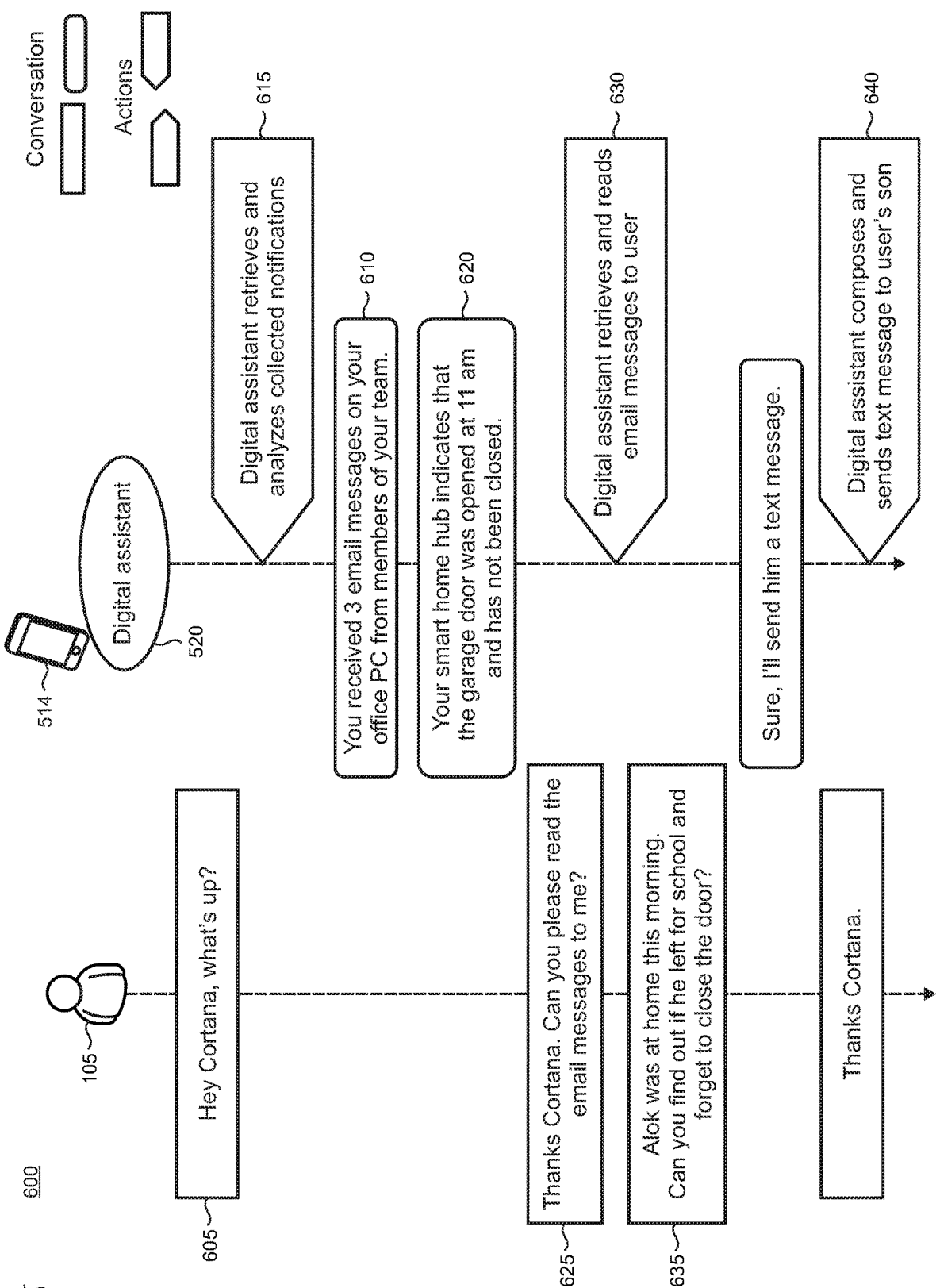

FIG. 6 shows a transcript 600 of the illustrative user experience and interaction that corresponds with the use scenario shown in FIG. 5 and described above. As shown, the user 105 has voice-based interactions with a digital assistant 520 (named "Cortana" in this illustrative example) that is operating on the smartphone 514. The user's dialog is shown on the left-hand side of the drawing using rectangles (representatively indicated by reference numeral 605). The digital assistant's dialog is shown on the right-hand side using rounded rectangles (representatively indicated by reference numeral 610). Actions are shown using flags (representatively indicated by reference numeral 615). By interacting through the natural language UI with the user 105 using voice, the digital assistant 112 can ascertain the user's intents and take responsive actions on the collected notifications.

As indicated in the transcript 600 at block 605, the user 105 can invoke the notification system into action using a query through the natural language UI, "What's up?" This particular expression is illustrative and the digital assistant can typically parse a wide variety of words, terms, phrases, constructs, and idioms to determine that the user is requesting status about notifications. Alternatively, the digital assistant can be configured to listen for specific keywords such as "notification" to invoke the system. The digital assistant retrieves and analyzes the collected notifications at flag 615 to determine responsive answers to the user's query.

At blocks 610 and 620, the digital assistant 520 informs the user 105 of notifications from an email application about emails at the office PC and a notification from a home security monitoring application about an open garage door at home. The digital assistant also provides some relevant context that is associated with the notifications including identification of the email senders, and the time that the garage door was opened. The digital assistant can determine the context, for example, by analyzing notification content and/or associated metadata.

The user asks that the digital assistant action on the email notification at block 625 and the digital responds by retrieving and reading the emails to the user at flag 630. The user asks a follow up question regarding his son at block 635. The digital assistant can apply available contextual data, for example by parsing the user's contact list on any of the devices (e.g., smartphone, laptop) to identify a suitable contact and text messaging number/address. Responsively to the query, the digital assistant composes and sends a text message to the user's son to inquire about his location at flag 640.

Figure 7:
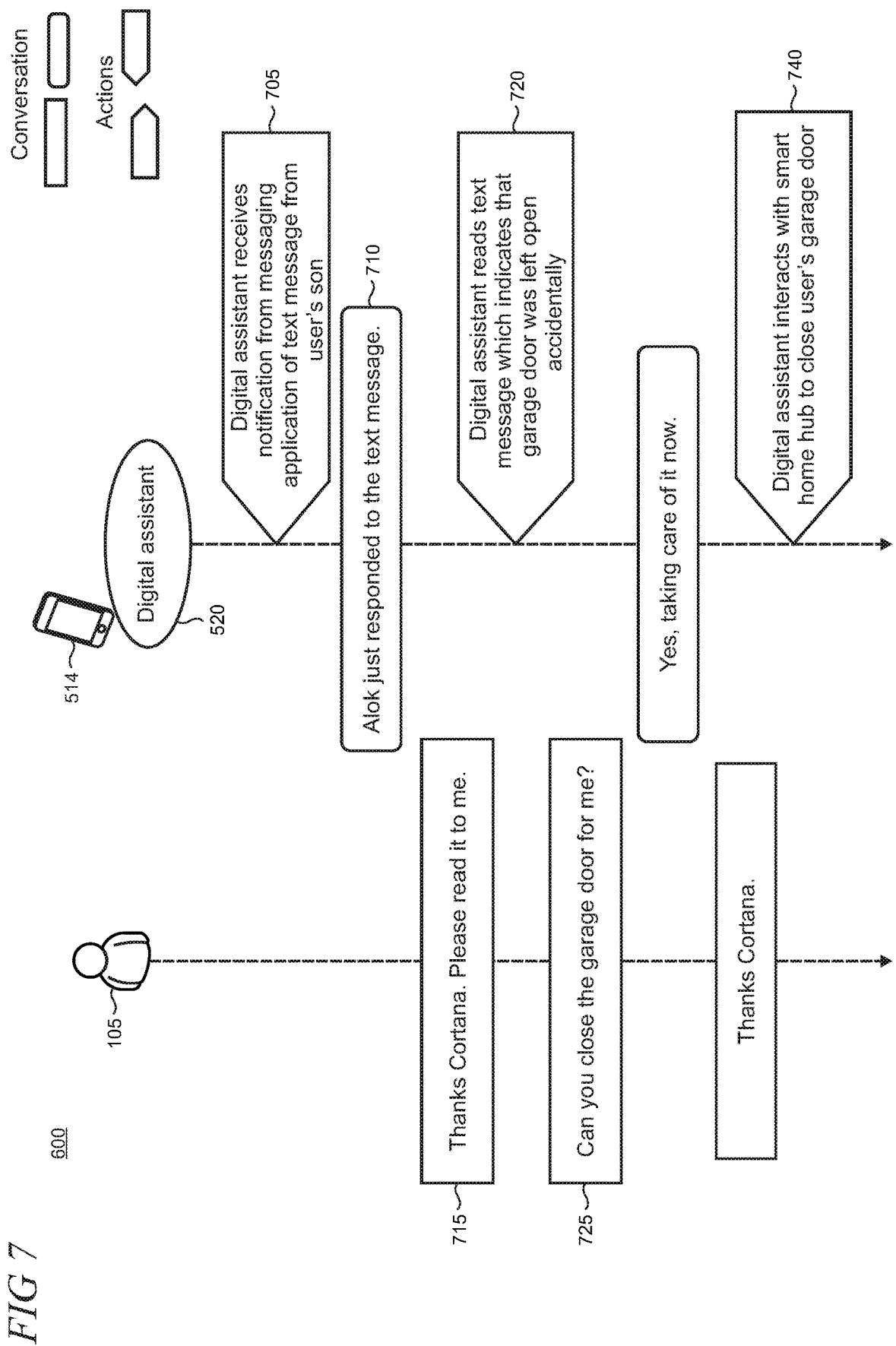

The transcript 600 continues at FIG. 7. The digital assistant 520 receives a notification at flag 705 from the messaging application on the smartphone 514 of a text message from the user's son and informs the user at block 710. The digital assistant reads the message at flag 720 in response to a user command at block 715. The digital assistant interacts with the remote smart home hub 512 at flag 740 to close the open door in response to the user's instructions at block 725. For example, the digital assistant may interact with the home security application running on the hub through an API, or interact with a home security service that is configured to facilitate remote control of hub-connected devices.

Figure 8:
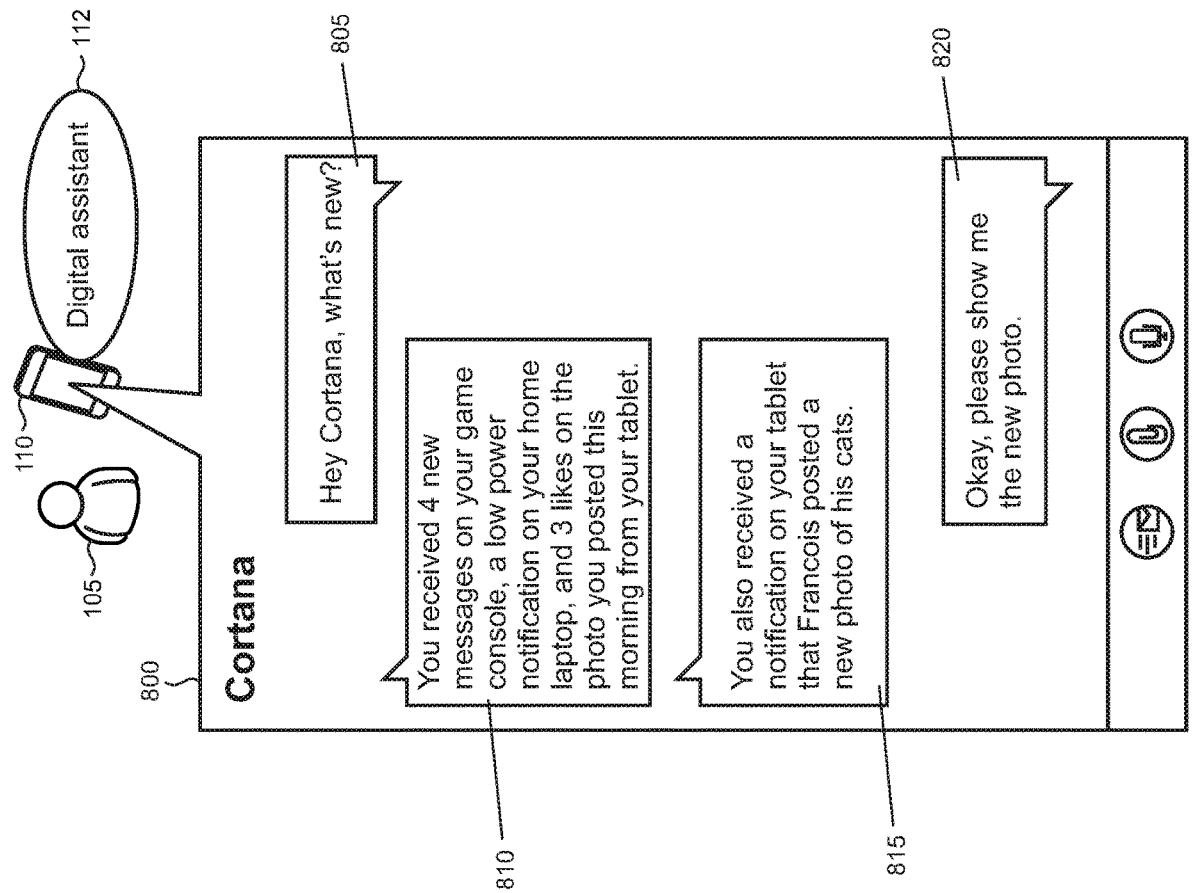
FIGS. 8 and 9 depict illustrative graphical user interfaces (GUIs) rendered on a device that show interaction with notifications with a digital assistant.

FIG. 8 shows an illustrative GUI 800 rendered on a computing device 110 that shows illustrative interactions between the device user 105 and the digital assistant 112 in a use scenario pertaining to notifications that are collected across the user's devices. In this scenario, the user interacts with the digital assistant using text messages on his smartphone as if the digital assistant were a regular human contact of the user. The user is out and about with the smartphone and has a tablet computer at home that is exclusively used for social media activities. The user's texts are shown on the right side of the GUI and the texts generated by the digital assistant are shown on the left side.

At message 805, the user invokes the notification system by asking the digital assistant "What's new?" As in the previous use scenario, the invocation phrase can vary as the digital assistant is able to parse the message 805 to determine the user's intent. At message 810, the digital assistant informs the user of new messages on a game console, a power state notification on a laptop, and feedback on a posting from a tablet computer to social media. The digital assistant informs the user of a new photo from the user's friend, Francois, at message 815 which the user requests to see at message 820.

Figure 9:
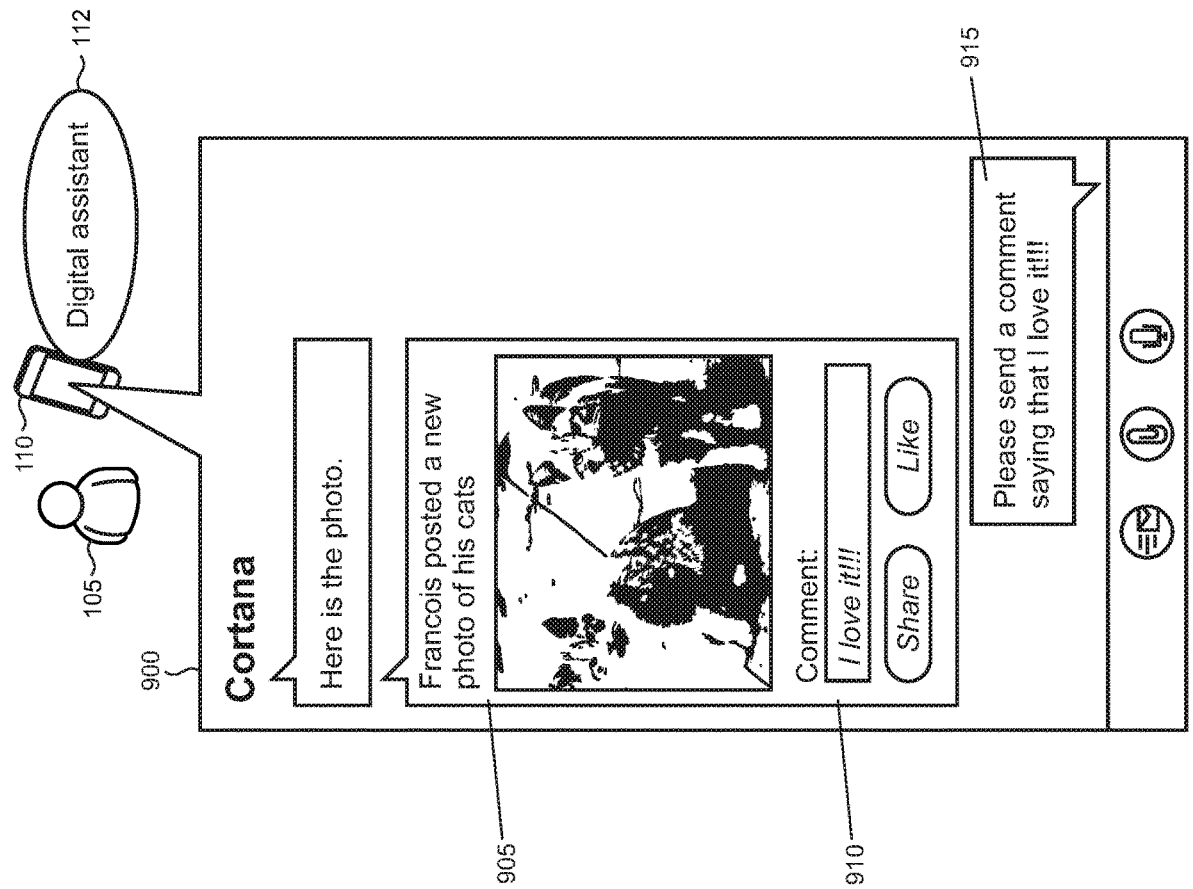

The messaging session between the user and digital assistant continues with the GUI 900 depicted in FIG. 9. The digital assistant recreates and renders the notification that includes the photo content on the GUI at message 905. In this illustrative example, the notification is configured to include actionable elements including a comment box 910 and buttons to share and like the content. The digital assistant may be configured to utilize actionable elements in a similar manner as a human user. The digital assistant actions on the notification in response to the user's request at message 915.

FIG. 10 shows a transcript 1000 of an illustrative use scenario that highlights the grouping functionality discussed above. In this example, the user invokes with a query "What did I miss?" at block 1005 (as noted above, phrases used to invoke the notification system can vary). At flag 1010, the digital assistant 112 analyzes available contextual data which may include implicitly or explicitly expressed user preferences, histories of user interactions with the digital assistant, user interactions with applications on the user's device, and/or user interactions with the device or other components thereof. Other examples of contextual data are described below in the text accompanying FIG. 13.

The contextual data analysis may be used to determine if sorting and filtering of collected notifications is appropriately utilized. In this example, the analysis indicates that sorting or filtering is not called for, so the digital assistant reports notifications collected across the user's devices at block 1015. The user poses a query at block 1020. The digital assistant parses the notifications in the collection (not shown) and responds to the user at block 1025 by grouping notification by sender, here a friend of the user named Michael. The grouping by sender extends across the user's devices and applications in this example. The digital assistant renders the grouped notifications in a single view on the user's device 110 at flag 1035 in response to an instruction from the user at block 1030.

Figure 11:
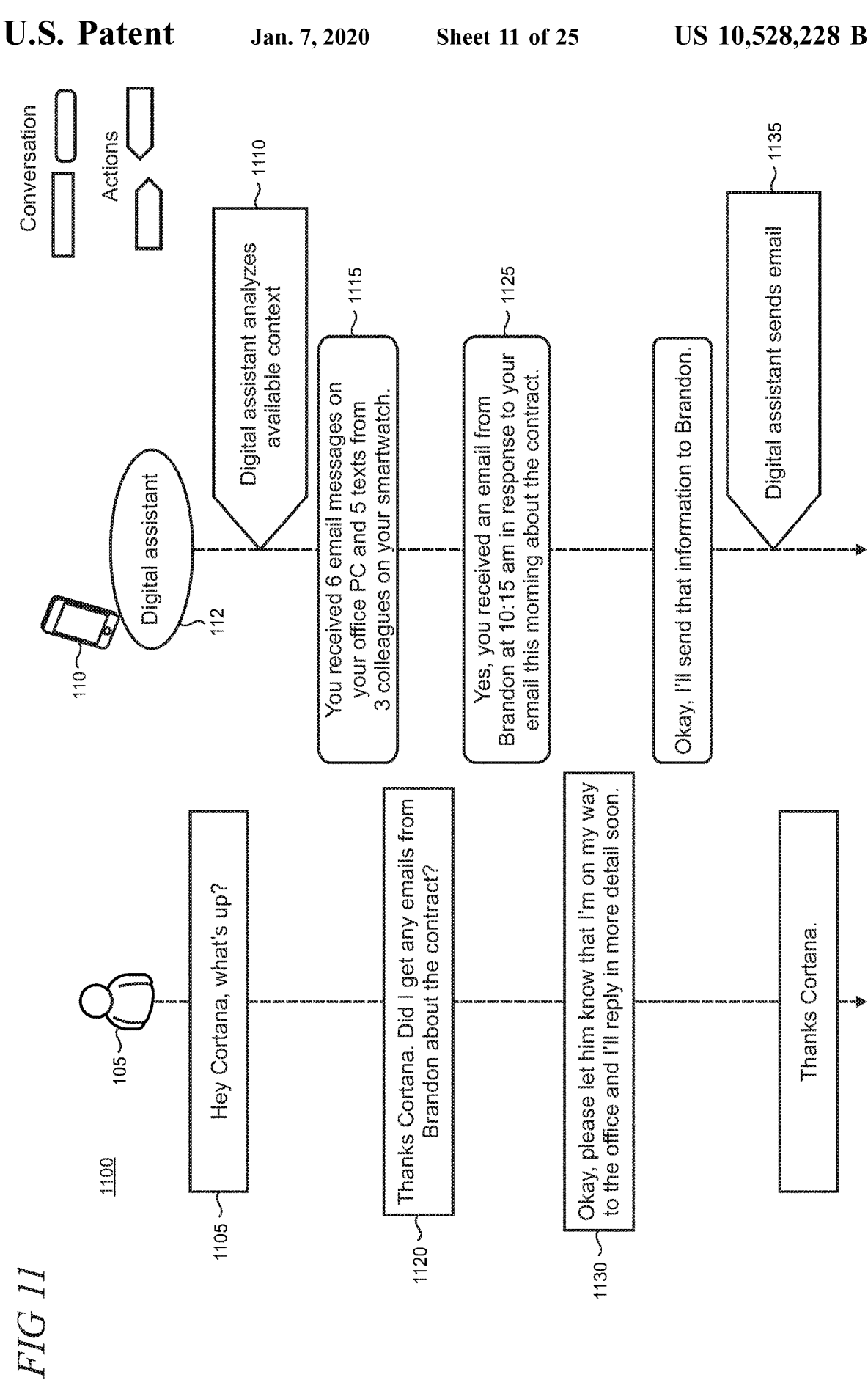

FIG. 11 shows a transcript 1100 of an illustrative use scenario that highlights the prioritization, query, and actioning functionalities discussed above. In this example, the user invokes the notification system with a query "What's up?" at block 1105 (as noted above, phrases used to invoke the notification system can vary). At flag 1110, the digital assistant 112 analyzes available contextual data and determines that the user places priority on work-related notifications that were collected across the user's devices and prefers not to be informed about other collected notifications. The digital assistant informs the user of the high priority notifications at block 1115.

The digital assistant performs analysis (not shown) to report additional information about the collected notifications at block 1125 in response to a user query at block 1120. The digital assistant performs a follow-on action at flag 1135 to compose and send a reply to an email in a notification responsively to an instruction from the user at block 1130.

Figure 12:
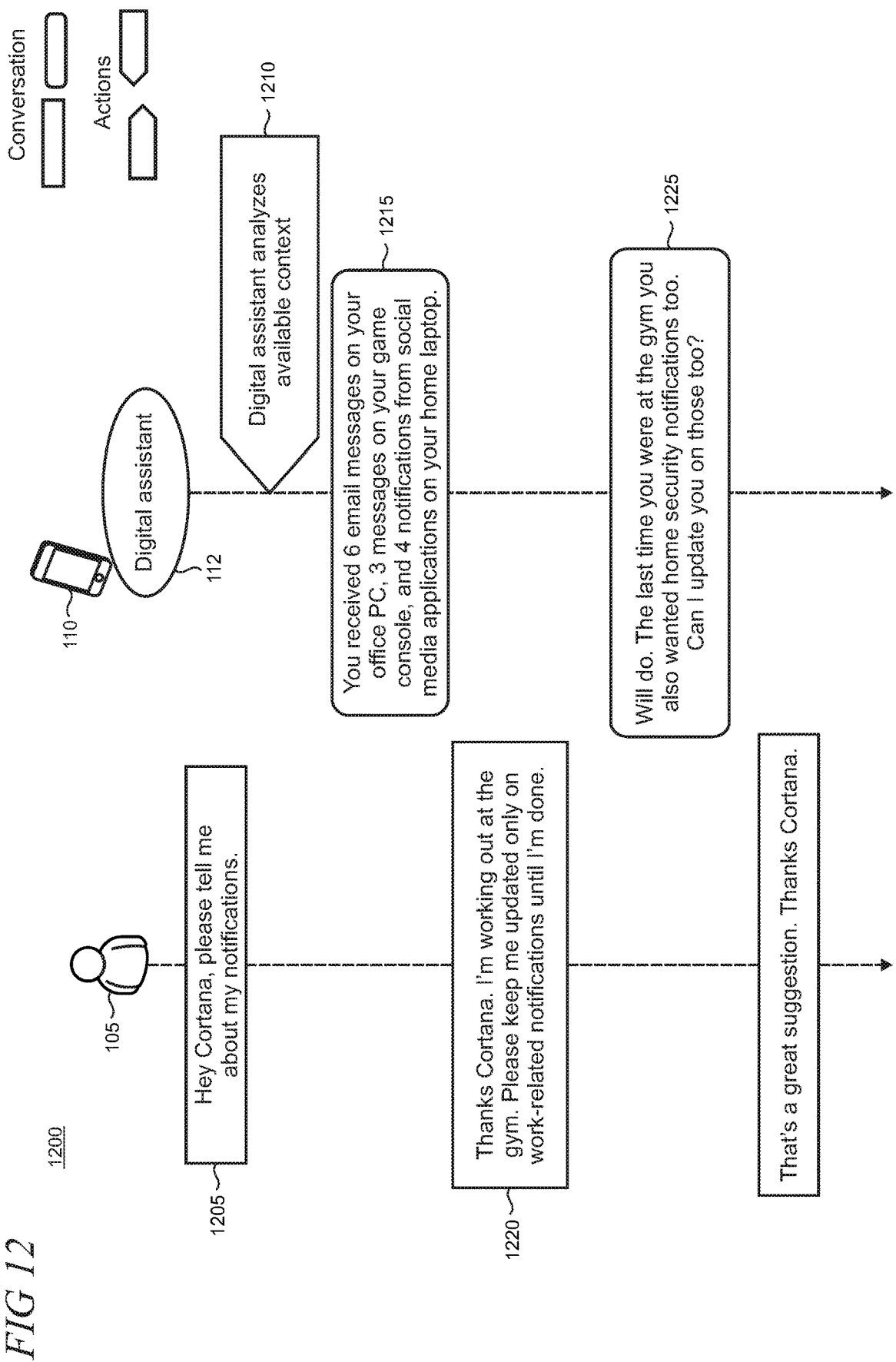

FIG. 12 shows a transcript 1200 of an illustrative use scenario that highlights the suggestions for notification system behavior functionality discussed above. In this example, the user 105 invokes the notification system with a query that contains the keyword "notification" at block 1205 (as noted above, phrases used to invoke the notification system can vary).

The digital assistant 112 analyzes available context to inform the user of collected notifications at flag 1210 and block 1215 respectively. The user informs the digital assistant of plans to go to the gym and filter notifications by sender at block 1220. In response, the digital assistant applies awareness of past user behaviors to make a suggestion to provide additional notification updates at block 1225.

Figure 13:
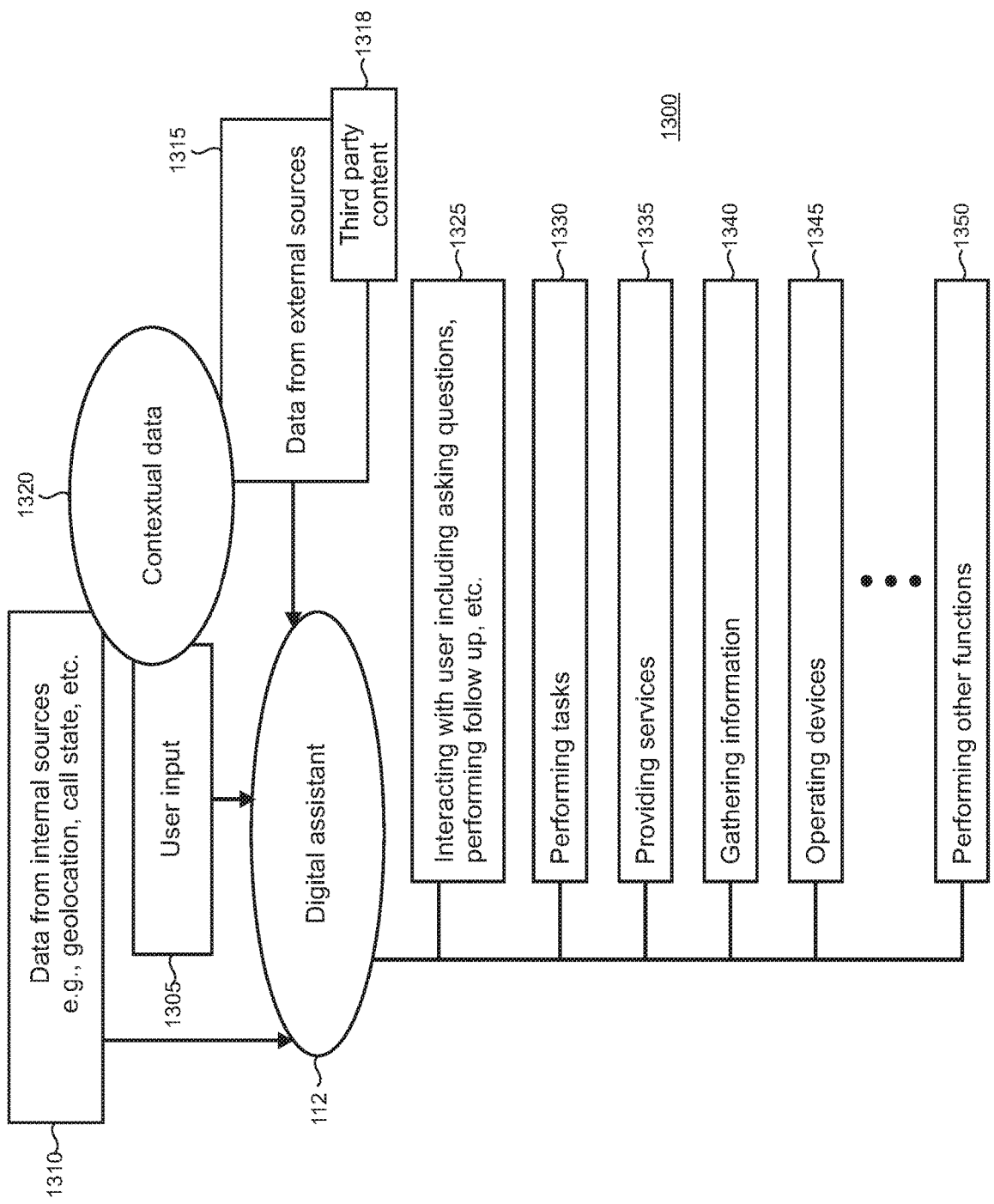
FIG. 13 shows illustrative inputs to a digital assistant and an illustrative taxonomy of general functions that may be performed by a digital assistant.

Turning now to various implementation details, FIG. 13 shows an illustrative taxonomy of functions 1300 that may typically be supported by the digital assistant 112 either natively or in combination with an application 215 (FIG. 2). Inputs to the digital assistant 112 typically can include user input 1305, data from internal sources 1310, and data from external sources 1315 which can include third-party content 1318. For example, data from internal sources 1310 could include the current location of the device 110 that is reported by a GPS (Global Positioning System) component on the device, or some other location-aware component. The externally sourced data 1315 includes data provided, for example, by external systems, databases, services, and the like.

The various inputs can be used alone or in various combinations to enable the digital assistant 112 to utilize contextual data 1320 when it operates. Contextual data can include, for example, time/date, the user's location, language, schedule, applications installed on the device, the user's preferences, the user's behaviors (in which such behaviors may be monitored/tracked with notice to the user and the user's consent), stored contacts (including, in some cases, links to a local user's or remote user's social graph such as those maintained by external social networking services), call history, messaging history, browsing history, device type, device capabilities, communication network type and/or features/functionalities provided therein, mobile data plan restrictions/limitations, data associated with other parties to a communication (e.g., their schedules, preferences, etc.), and the like.

As shown, the functions 1300 illustratively include interacting with the user 1325 (through a natural language user interface and other graphical interfaces, for example); performing tasks 1330 (e.g., making note of appointments in the user's calendar, sending messages and emails, etc.); providing services 1335 (e.g., answering questions from the user, mapping directions to a destination, setting alarms, forwarding notifications, reading emails, news, blogs, etc.); gathering information 1340 (e.g., finding information requested by the user about a book or movie, locating the nearest Italian restaurant, etc.); operating devices 1345 (e.g., setting preferences, adjusting screen brightness, turning wireless connections such as Wi-Fi and Bluetooth on and off, communicating with other devices, controlling smart appliances, etc.); and performing various other functions 1350. The list of functions 1300 is not intended to be exhaustive and other functions may be provided by the digital assistant 112 and/or applications as may be needed for a particular implementation of the present interaction with notifications across devices with a digital assistant.

The digital assistant 112 can be exposed to the user 105 through a UI that is displayed on a device 110. For example, FIGS. 14, 15, and 16 show various illustrative screen captures of UIs that may be utilized in the present interaction with notifications across devices with a digital assistant. It is emphasized that the particular UIs displayed in the drawings can vary from what is shown according to the needs of a particular implementation. UI 1400 in FIG. 14 shows the digital assistant represented by a tile 1405 that is displayed along with tiles representing other applications or user experiences on a start screen of a device. The digital assistant may also be configured to be launched from any location within any UI on the device, or from within any current user experience. For example, the user can be on a phone call, browsing the web, watching a video, or listening to music, and simultaneously launch the digital assistant from within any of those experiences. In some cases the digital assistant can be launched through manipulation of a physical or virtual user control, and/or by voice command and/or gesture in other cases.

When the user invokes the digital assistant, for example, by touching the tile 1405 or by invoking a voice command or gesture, a UI 1500 shown in FIG. 15 is displayed on the device 110 that includes a text string 1505 that asks the user if something is needed. In alternative implementations, text to voice translation can be employed so that an audio message can be played in place of, or to supplement the text string 1505. As shown, the UI includes a box 1510 that is configured for showing a textual representation of a received voice command or other user input.

One or more graphic objects 1515 can be displayed on the UI 1500 to represent the digital assistant to the user. The graphic object 1515 in this example is a circular shape that can be animated so that, for example, it changes its shape, color, transparency, motion, or appearance as the digital assistant performs tasks, provides information, interacts with the user, etc.

As shown in the UI 1600 in FIG. 16, the user has input the string "open mail" 1605 into the box 1610 using, for example, keypad input or voice command. In response to the input, the digital assistant can launch an email application on the device. Thus, for example, when the user is on a phone call and the remote party asks "have you read the email I sent you yet?" the user can ask the digital assistant to open the email from the remote party and read it back. The digital assistant can maintain awareness of call state and other context to determine the identity of the remote party and can thus locate the email of interest for the user.

Figure 17:
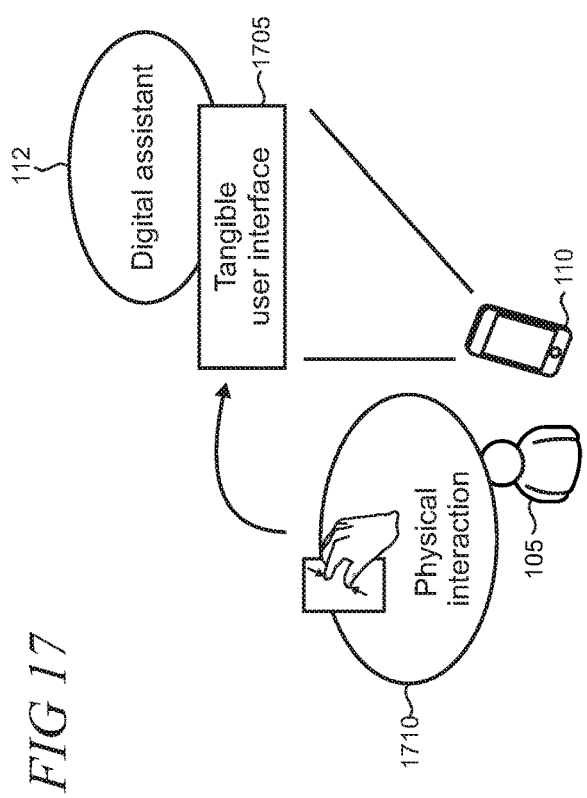

A user can typically interact with the digital assistant 112 in a number of ways depending on the features and functionalities supported by a given device 110. For example, as shown in FIG. 17, the digital assistant 112 may expose a tangible user interface 1705 that enables the user 105 to employ physical interactions 1710 in support of user experiences on the device 110. Such physical interactions can include manipulation of physical and/or virtual controls such as buttons, menus, keyboards, etc., using touch-based inputs like tapping, flicking, dragging, etc. on a touchscreen, and the like.

Figure 18:
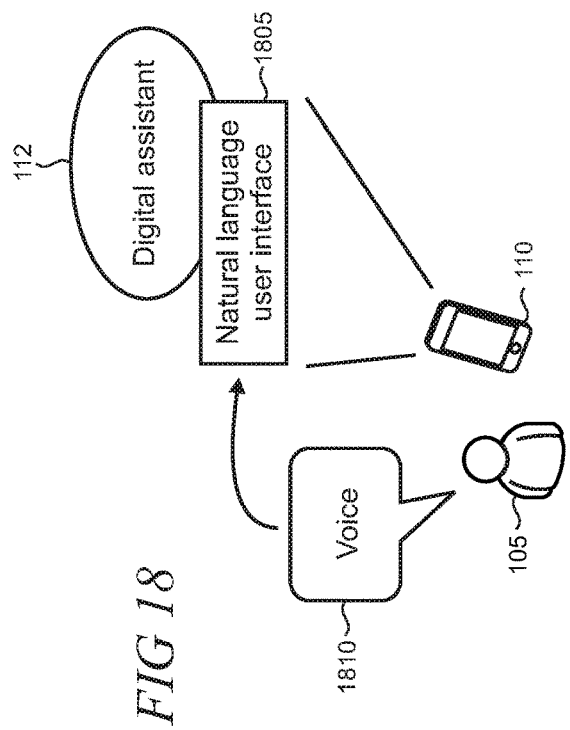

In some implementations, the digital assistant 112 may expose a natural language user interface 1805 shown in FIG. 18, or alternatively a voice command-based user interface (not shown), with which the user employs voice 1810 to provide various inputs to the device 110.

Figure 19:
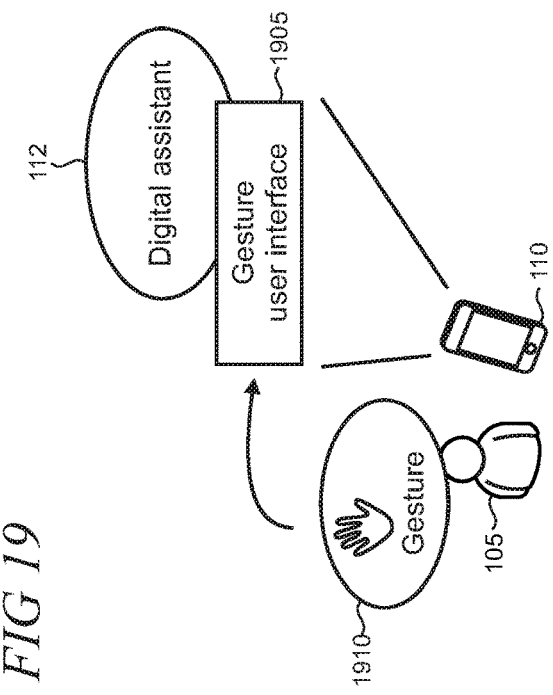
FIGS. 17, 18, and 19 show illustrative interfaces between a user and a digital assistant.

In other implementations, the digital assistant 112 may expose a gesture user interface 1905 shown in FIG. 19 with which the user 105 employs gestures 1910 to provide inputs to the device 110. It is noted that in some cases, combinations of user interfaces may be utilized where the user may employ, for example, both voice and physical inputs to interact with the digital assistant 112 and the device 110. The user gestures can be sensed using various techniques such as optical sensing, touch sensing, proximity sensing, and the like.

Figure 20:
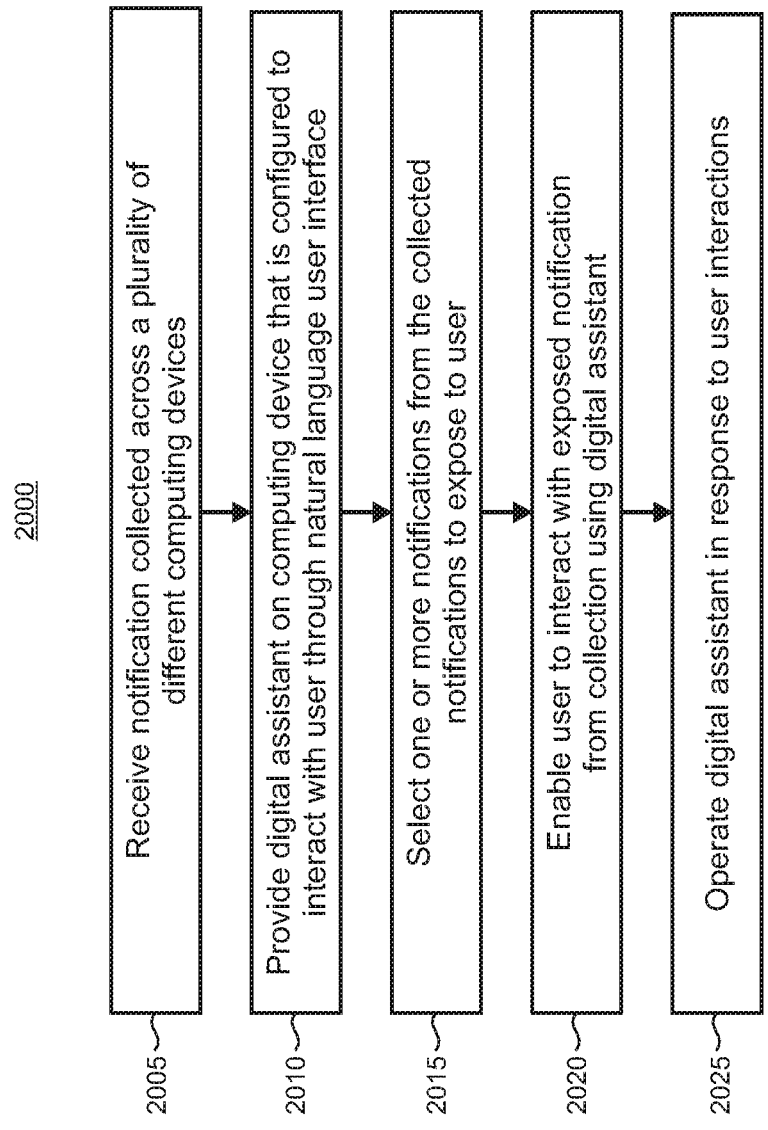
FIGS. 20, 21, and 22 show illustrative methods that may be performed when implementing the present interaction with notifications across devices with a digital assistant.

FIG. 20 shows a flowchart of an illustrative method 2000 that may be performed on a computing device (e.g., device 110 in FIG. 1). Unless specifically stated, the methods or steps shown in the flowcharts and described in the accompanying text are not constrained to a particular order or sequence. In addition, some of the methods or steps thereof can occur or be performed concurrently and not all the methods or steps have to be performed in a given implementation depending on the requirements of such implementation and some methods or steps may be optionally utilized.

At step 2005, the device receives notifications collected across a plurality of different computing devices. At step 2010, a digital assistant is provided that is configured to interact with the user through a natural language interface. At step 2015, one or more notifications are selected from the collected notifications for exposure to the user. At step 2020, the user is enabled to interact with the exposed notifications from the collection using the digital assistant. At step 2025, the digital assistant is operated in response to the user interaction with the digital assistant.

Figure 21:
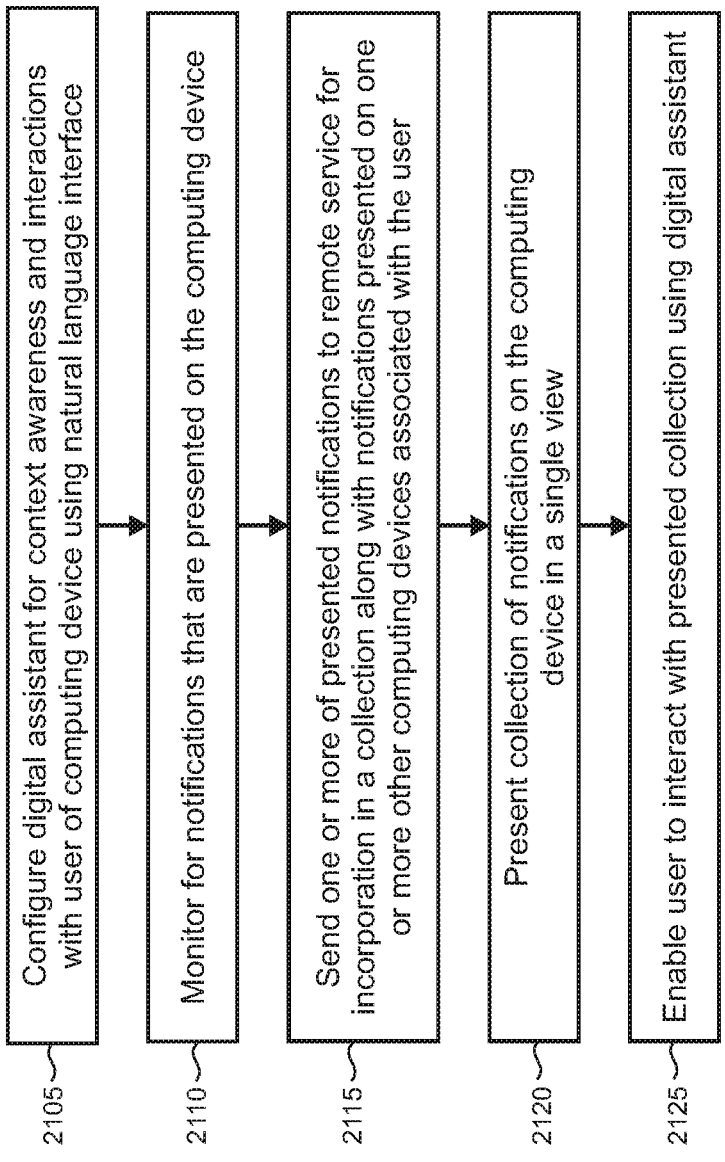

FIG. 21 is a flowchart of an illustrative method 2100 that may be implemented on a computing device (e.g., device 110 in FIG. 1). At step 2105, a digital assistant is configured for context awareness and interactions with a computing device user with a natural language interface. At step 2110, notifications presented on the computing device are monitored. At step 2115, one or more of the presented notifications are sent to a remote service to be incorporated into a collection with notifications presented on one or more other computing devices. At step 2120, the collection of notifications is presented on the computing device in a single view. At step 2125, the user is enabled to interact with the presented collection using the digital assistant.

Figure 22:
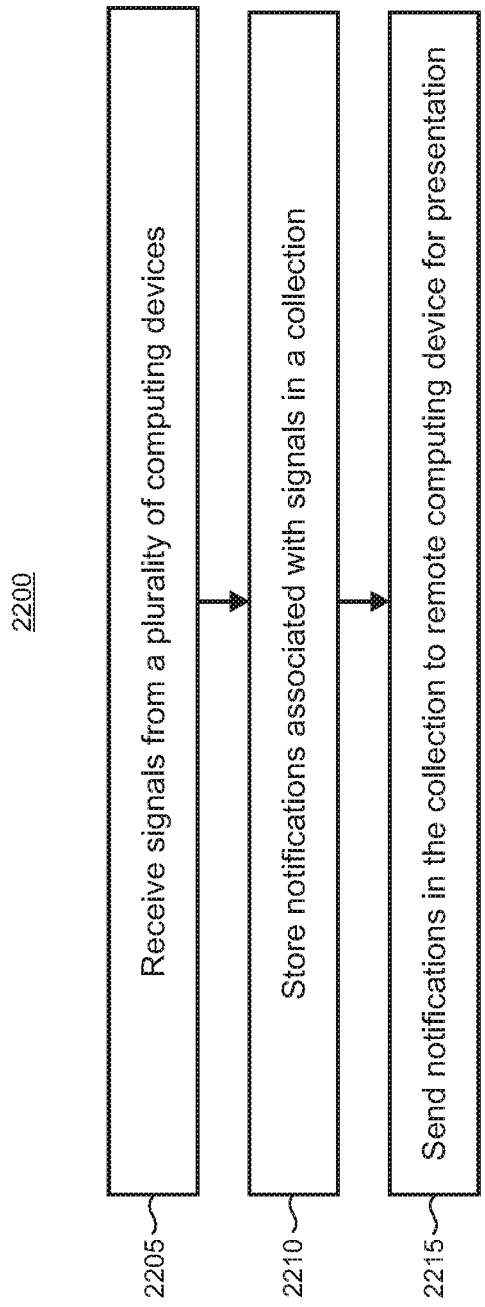

FIG. 22 shows an illustrative method 2200 that may be utilized by a server utilized by a service provider. At step 2205, signals are received from a plurality of computing devices. At step 2210, notifications associated with the signals are stored in a collection. At step 2215, notifications in the collection are sent to a remote computing device for presentation.

Figure 23:
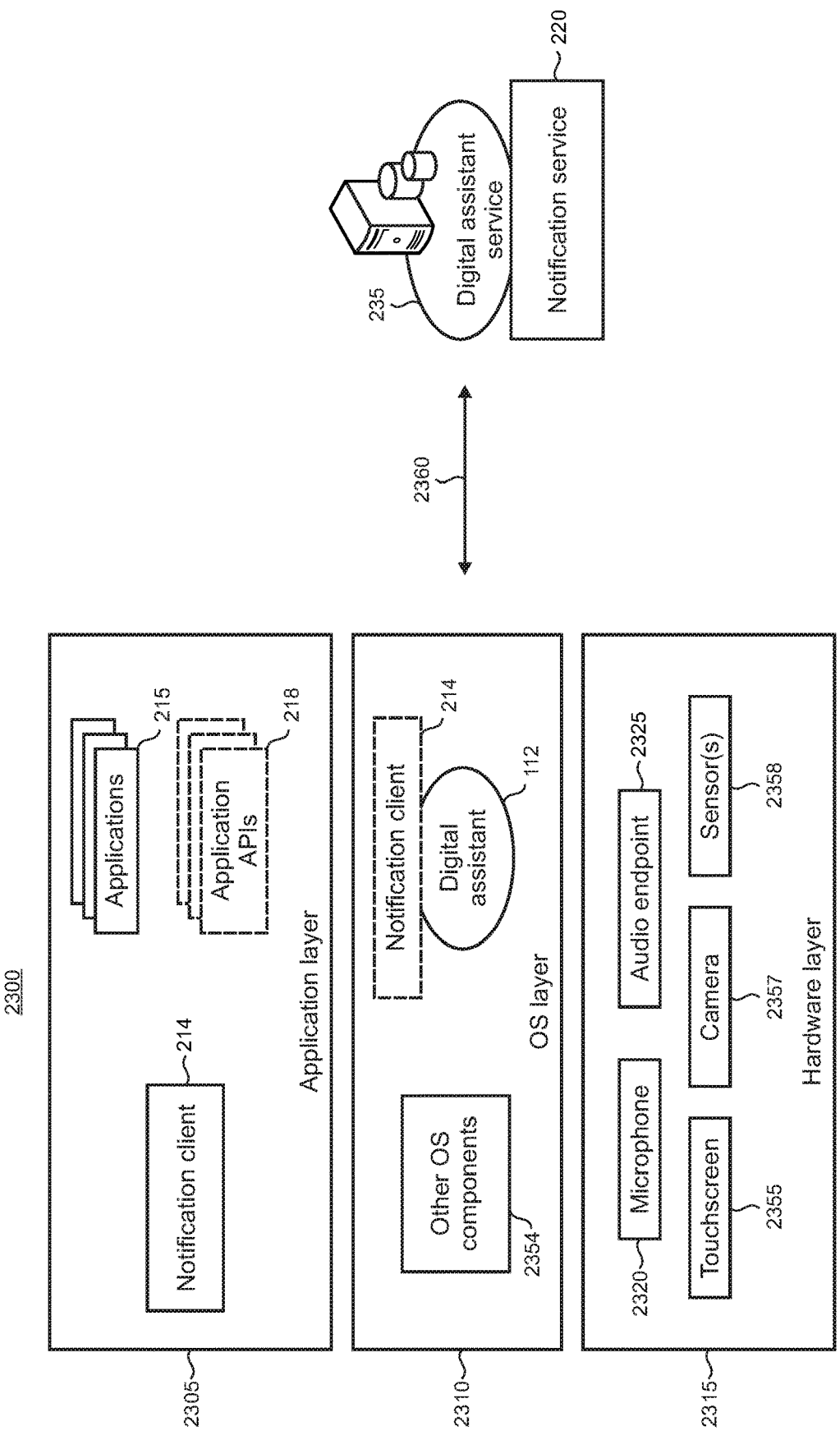
FIG. 23 shows an illustrative layered architecture.

FIG. 23 shows an illustrative layered architecture 2300 that may be instantiated on a given device 110. The architecture 2300 is typically implemented in software, although combinations of software, firmware, and/or hardware may also be utilized in some cases. The architecture 2300 is arranged in layers and includes an application layer 2305, an OS (operating system) layer 2310, and a hardware layer 2315. The hardware layer 2315 provides an abstraction of the various hardware used by the device 110 (e.g., input and output devices, networking and radio hardware, etc.) to the layers above it. In this illustrative example, the hardware layer supports a microphone 2320, an audio endpoint 2325 which may include, for example, the device's internal speaker, a wired or wireless headset/earpiece, external speaker/device, and the like, a touchscreen 2355, camera 2357, and one or more sensors 2358. The hardware layer components may facilitate implementation of UIs supporting interactions between the user and digital assistant.

The application layer 2305 in this illustrative example supports various applications 215 (e.g., web browser, map application, email application, news application, etc.) and optionally utilized application extensions and/or APIs 218. The applications are often implemented using locally executing code. However in some cases, these applications can rely on services and/or remote code execution provided by remote servers or other computing platforms such as those supported by a service provider or other cloud-based resources. While the notification client 214 is shown here as a component that is instantiated in the application layer 2305, it may be appreciated that the functionality provided by a given application may be implemented, in whole or part, using components that are supported in either the OS or hardware layers.

The OS layer 2310 supports the digital assistant 112 and various other OS components 2354. In alternative implementations, the notification client 214 can be optionally instantiated in the OS layer, as shown by the dashed rectangle. In typical implementations, the digital assistant 112 can interact with the digital assistant service 235 and/or notification service 220, as indicated by line 2360. That is, the digital assistant 112 in some implementations can partially utilize or fully utilize remote code execution supported at the services 220 and/or 235, or using other remote resources. In addition, it may utilize and/or interact with the other OS components 2354 (and/or other components that are instantiated in the other layers of the architecture 2300) as may be needed to implement the various features and functions described herein. In some implementations, some or all of the functionalities supported by the notification client 214 can be incorporated into the digital assistant 112 and the particular division of functionality between the services can be selected as a matter of design choice. The digital assistant 112 can also interact with other suitable services (not shown) that are partially or fully instantiated locally on the device 110. For example, such services can apply local resources and implement local logic in order to support a variety of user experiences and features.

Figure 24:
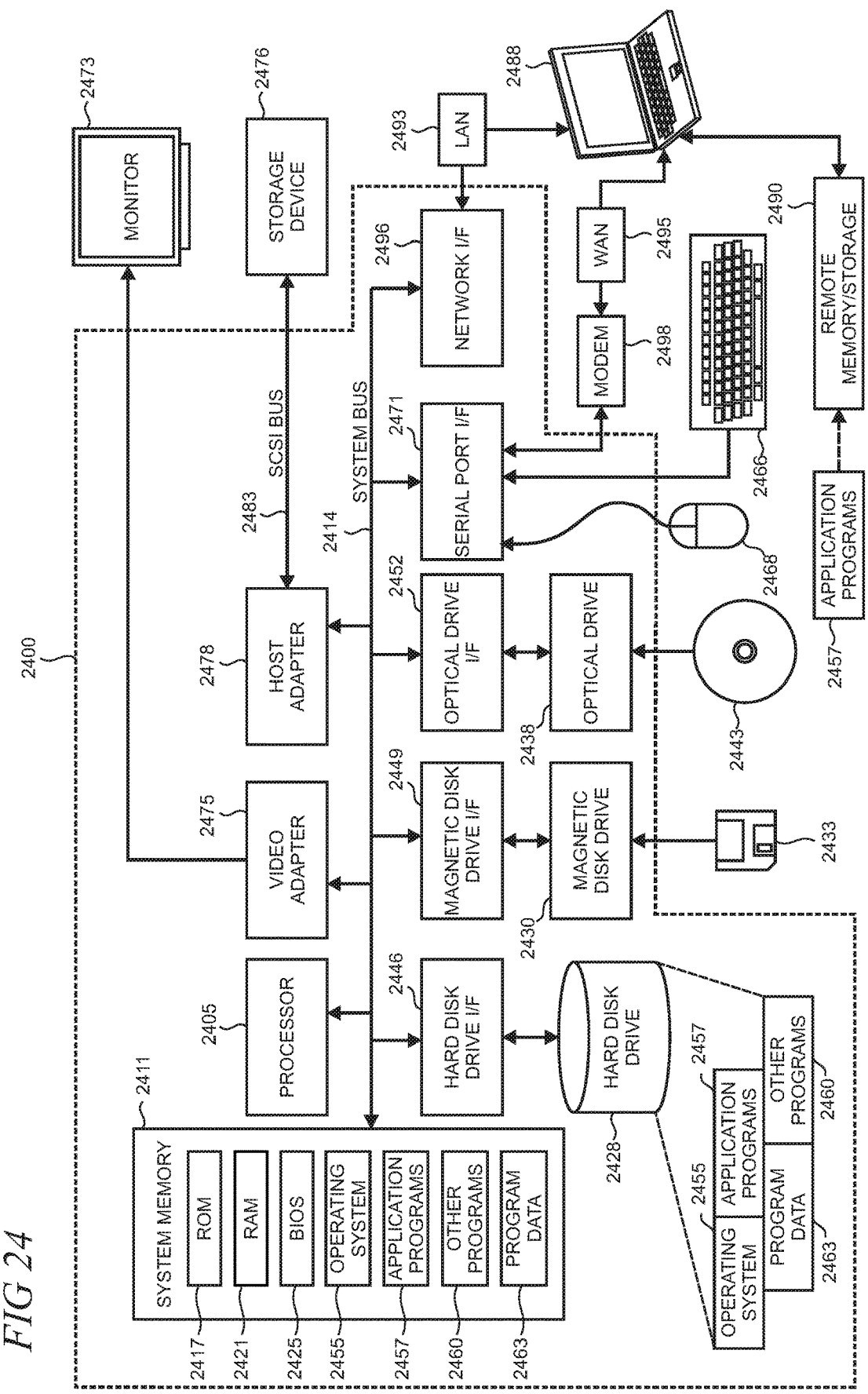
FIG. 24 is a simplified block diagram of an illustrative computer system such as a personal computer (PC) that may be used in part to implement the present interaction with notifications across devices with a digital assistant.

FIG. 24 is a simplified block diagram of an illustrative computer system 2400 such as a PC, client machine, or server with which the present interaction with notifications across devices with a digital assistant may be implemented. Computer system 2400 includes a processor 2405, a system memory 2411, and a system bus 2414 that couples various system components including the system memory 2411 to the processor 2405. The system bus 2414 may be any of several types of bus structures including a memory bus or memory controller, a peripheral bus, or a local bus using any of a variety of bus architectures. The system memory 2411 includes read only memory (ROM) 2417 and random access memory (RAM) 2421. A basic input/output system (BIOS) 2425, containing the basic routines that help to transfer information between elements within the computer system 2400, such as during startup, is stored in ROM 2417. The computer system 2400 may further include a hard disk drive 2428 for reading from and writing to an internally disposed hard disk (not shown), a magnetic disk drive 2430 for reading from or writing to a removable magnetic disk 2433 (e.g., a floppy disk), and an optical disk drive 2438 for reading from or writing to a removable optical disk 2443 such as a CD (compact disc), DVD (digital versatile disc), or other optical media. The hard disk drive 2428, magnetic disk drive 2430, and optical disk drive 2438 are connected to the system bus 2414 by a hard disk drive interface 2446, a magnetic disk drive interface 2449, and an optical drive interface 2452, respectively. The drives and their associated computer-readable storage media provide non-volatile storage of computer-readable instructions, data structures, program modules, and other data for the computer system 2400. Although this illustrative example includes a hard disk, a removable magnetic disk 2433, and a removable optical disk 2443, other types of computer-readable storage media which can store data that is accessible by a computer such as magnetic cassettes, Flash memory cards, digital video disks, data cartridges, random access memories (RAMs), read only memories (ROMs), and the like may also be used in some applications of the present interaction with notifications across devices with a digital assistant. In addition, as used herein, the term computer-readable storage media includes one or more instances of a media type (e.g., one or more magnetic disks, one or more CDs, etc.). For purposes of this specification and the claims, the phrase "computer-readable storage media" and variations thereof, does not include waves, signals, and/or other transitory and/or intangible communication media.

A number of program modules may be stored on the hard disk, magnetic disk 2433, optical disk 2443, ROM 2417, or RAM 2421, including an operating system 2455, one or more application programs 2457, other program modules 2460, and program data 2463. A user may enter commands and information into the computer system 2400 through input devices such as a keyboard 2466 and pointing device 2468 such as a mouse. Other input devices (not shown) may include a microphone, joystick, game pad, satellite dish, scanner, trackball, touchpad, touchscreen, touch-sensitive device, voice-command module or device, user motion or user gesture capture device, or the like. These and other input devices are often connected to the processor 2405 through a serial port interface 2471 that is coupled to the system bus 2414, but may be connected by other interfaces, such as a parallel port, game port, or universal serial bus (USB). A monitor 2473 or other type of display device is also connected to the system bus 2414 via an interface, such as a video adapter 2475. In addition to the monitor 2473, personal computers typically include other peripheral output devices (not shown), such as speakers and printers. The illustrative example shown in FIG. 24 also includes a host adapter 2478, a Small Computer System Interface (SCSI) bus 2483, and an external storage device 2476 connected to the SCSI bus 2483.

The computer system 2400 is operable in a networked environment using logical connections to one or more remote computers, such as a remote computer 2488. The remote computer 2488 may be selected as another personal computer, a server, a router, a network PC, a peer device, or other common network node, and typically includes many or all of the elements described above relative to the computer system 2400, although only a single representative remote memory/storage device 2490 is shown in FIG. 24. The logical connections depicted in FIG. 24 include a local area network (LAN) 2493 and a wide area network (WAN) 2495. Such networking environments are often deployed, for example, in offices, enterprise-wide computer networks, intranets, and the Internet.

When used in a LAN networking environment, the computer system 2400 is connected to the local area network 2493 through a network interface or adapter 2496. When used in a WAN networking environment, the computer system 2400 typically includes a broadband modem 2498, network gateway, or other means for establishing communications over the wide area network 2495, such as the Internet. The broadband modem 2498, which may be internal or external, is connected to the system bus 2414 via a serial port interface 2471. In a networked environment, program modules related to the computer system 2400, or portions thereof, may be stored in the remote memory storage device 2490. It is noted that the network connections shown in FIG. 24 are illustrative and other means of establishing a communications link between the computers may be used depending on the specific requirements of an application of the present interaction with notifications across devices with a digital assistant.

Figure 25:
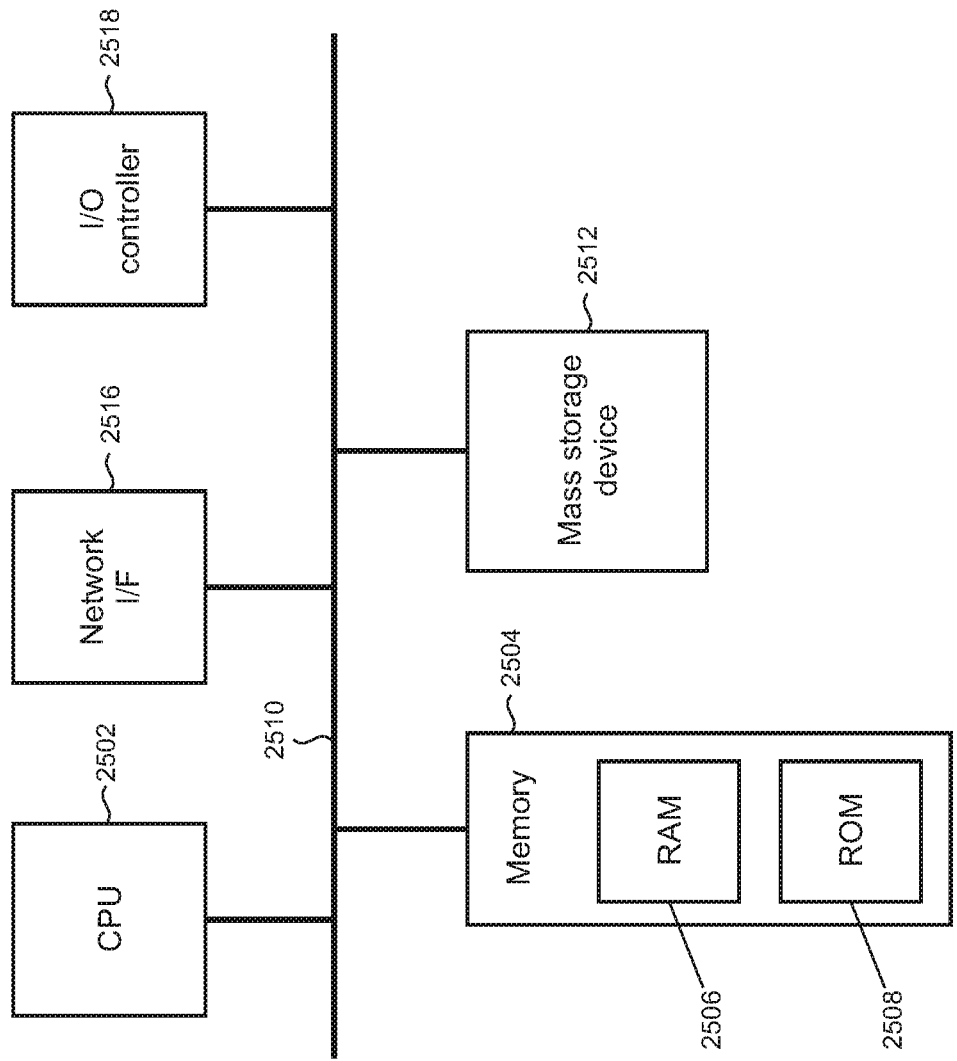
FIG. 25 shows a block diagram of an illustrative device that may be used in part to implement the present interaction with notifications across devices with a digital assistant.

FIG. 25 shows an illustrative architecture 2500 for a device capable of executing the various components described herein for providing the present interaction with notifications across devices with a digital assistant. Thus, the architecture 2500 illustrated in FIG. 25 shows an architecture that may be adapted for a server computer, mobile phone, a PDA, a smartphone, a desktop computer, a netbook computer, a tablet computer, GPS device, gaming console, and/or a laptop computer. The architecture 2500 may be utilized to execute any aspect of the components presented herein.

The architecture 2500 illustrated in FIG. 25 includes a CPU (Central Processing Unit) 2502, a system memory 2504, including a RAM 2506 and a ROM 2508, and a system bus 2510 that couples the memory 2504 to the CPU 2502. A basic input/output system containing the basic routines that help to transfer information between elements within the architecture 2500, such as during startup, is stored in the ROM 2508. The architecture 2500 further includes a mass storage device 2512 for storing software code or other computer-executed code that is utilized to implement applications, the file system, and the operating system.

The mass storage device 2512 is connected to the CPU 2502 through a mass storage controller (not shown) connected to the bus 2510. The mass storage device 2512 and its associated computer-readable storage media provide non-volatile storage for the architecture 2500.

Although the description of computer-readable storage media contained herein refers to a mass storage device, such as a hard disk or CD-ROM drive, it should be appreciated by those skilled in the art that computer-readable storage media can be any available storage media that can be accessed by the architecture 2500.

By way of example, and not limitation, computer-readable storage media may include volatile and non-volatile, removable and non-removable media implemented in any method or technology for storage of information such as computer-readable instructions, data structures, program modules, or other data. For example, computer-readable media includes, but is not limited to, RAM, ROM, EPROM (erasable programmable read only memory), EEPROM (electrically erasable programmable read only memory), Flash memory or other solid state memory technology, CD-ROM, DVDs, HD-DVD (High Definition DVD), Blu-ray, or other optical storage, magnetic cassettes, magnetic tape, magnetic disk storage or other magnetic storage devices, or any other medium which can be used to store the desired information and which can be accessed by the architecture 2500.

According to various embodiments, the architecture 2500 may operate in a networked environment using logical connections to remote computers through a network. The architecture 2500 may connect to the network through a network interface unit 2516 connected to the bus 2510. It should be appreciated that the network interface unit 2516 also may be utilized to connect to other types of networks and remote computer systems. The architecture 2500 also may include an input/output controller 2518 for receiving and processing input from a number of other devices, including a keyboard, mouse, or electronic stylus (not shown in FIG. 25). Similarly, the input/output controller 2518 may provide output to a display screen, a printer, or other type of output device (also not shown in FIG. 25).

It should be appreciated that the software components described herein may, when loaded into the CPU 2502 and executed, transform the CPU 2502 and the overall architecture 2500 from a general-purpose computing system into a special-purpose computing system customized to facilitate the functionality presented herein. The CPU 2502 may be constructed from any number of transistors or other discrete circuit elements, which may individually or collectively assume any number of states. More specifically, the CPU 2502 may operate as a finite-state machine, in response to executable instructions contained within the software modules disclosed herein. These computer-executable instructions may transform the CPU 2502 by specifying how the CPU 2502 transitions between states, thereby transforming the transistors or other discrete hardware elements constituting the CPU 2502.

Encoding the software modules presented herein also may transform the physical structure of the computer-readable storage media presented herein. The specific transformation of physical structure may depend on various factors, in different implementations of this description. Examples of such factors may include, but are not limited to, the technology used to implement the computer-readable storage media, whether the computer-readable storage media is characterized as primary or secondary storage, and the like. For example, if the computer-readable storage media is implemented as semiconductor-based memory, the software disclosed herein may be encoded on the computer-readable storage media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable storage media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the architecture 2500 in order to store and execute the software components presented herein. It also should be appreciated that the architecture 2500 may include other types of computing devices, including handheld computers, embedded computer systems, smartphones, PDAs, and other types of computing devices known to those skilled in the art. It is also contemplated that the architecture 2500 may not include all of the components shown in FIG. 25, may include other components that are not explicitly shown in FIG. 25, or may utilize an architecture completely different from that shown in FIG. 25.

Figure 26:
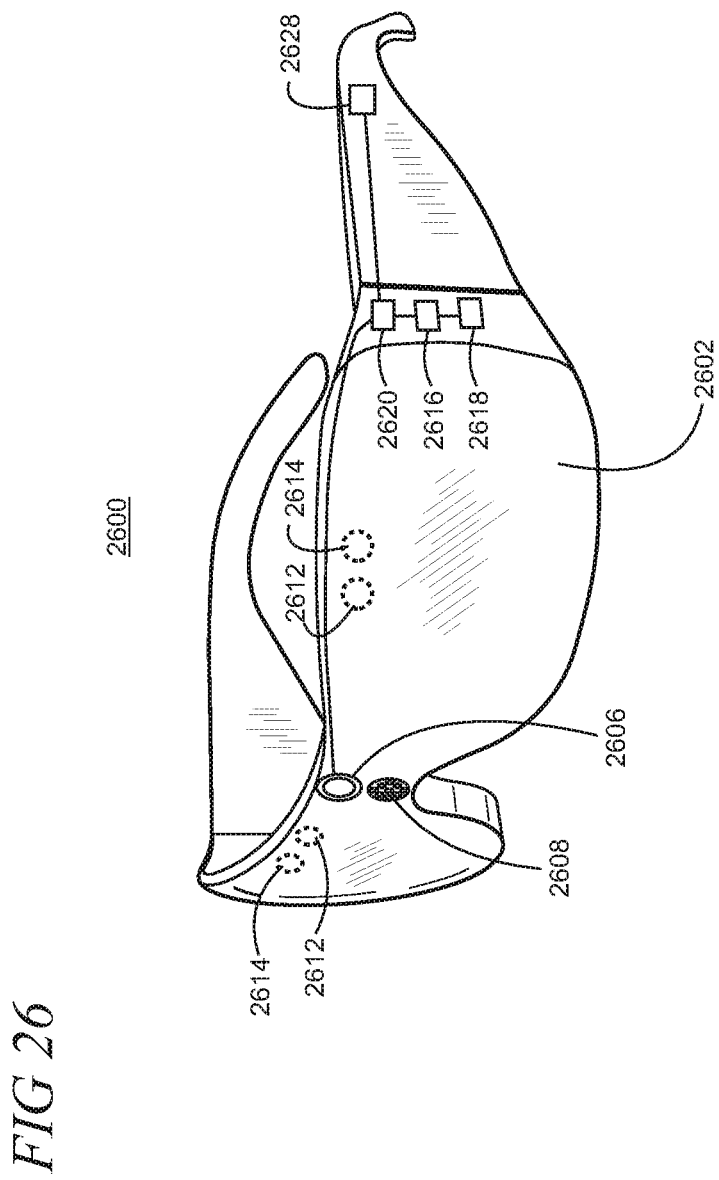
FIG. 26 is a pictorial view of an illustrative example of a virtual reality or mixed reality head mounted display (HMD) device.
Figure 27:
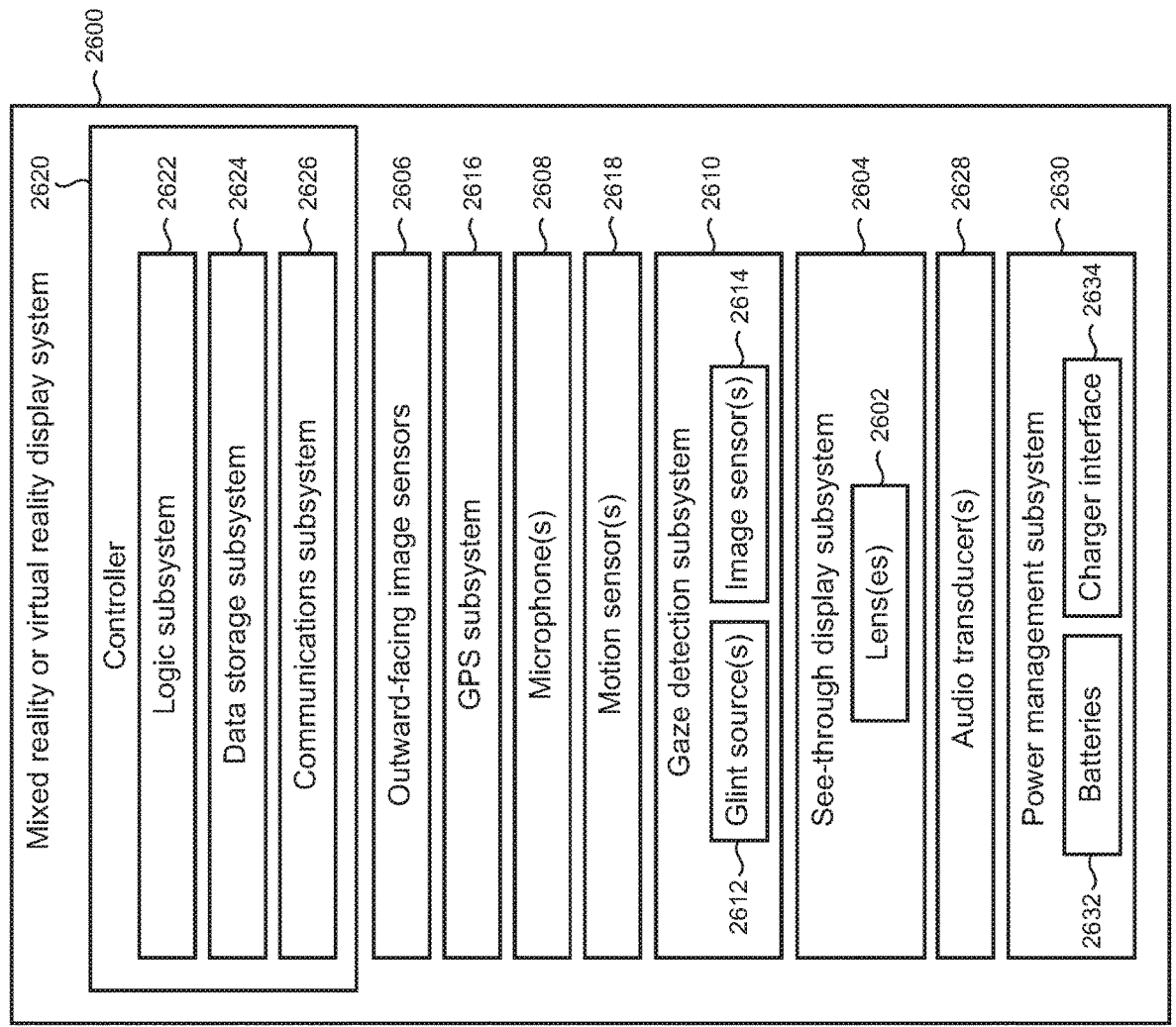
FIG. 27 shows a block diagram of an illustrative example of a virtual reality or mixed reality HMD device.

FIG. 26 shows one particular illustrative example of a see-through, mixed reality or virtual reality display system 2600, and FIG. 27 shows a functional block diagram of the system 2600. Display system 2600 comprises one or more lenses 2602 that form a part of a see-through display subsystem 2604, such that images may be displayed using lenses 2602 (e.g. using projection onto lenses 2602, one or more waveguide systems incorporated into the lenses 2602, and/or in any other suitable manner). Display system 2600 further comprises one or more outward-facing image sensors 2606 configured to acquire images of a background scene and/or physical environment being viewed by a user, and may include one or more microphones 2608 configured to detect sounds, such as voice commands from a user. Outward-facing image sensors 2606 may include one or more depth sensors and/or one or more two-dimensional image sensors. In alternative arrangements, as noted above, a mixed reality or virtual reality display system, instead of incorporating a see-through display subsystem, may display mixed reality or virtual reality images through a viewfinder mode for an outward-facing image sensor.

The display system 2600 may further include a gaze detection subsystem 2610 configured for detecting a direction of gaze of each eye of a user or a direction or location of focus, as described above. Gaze detection subsystem 2610 may be configured to determine gaze directions of each of a user's eyes in any suitable manner. For example, in the illustrative example shown, a gaze detection subsystem 2610 includes one or more glint sources 2612, such as infrared light sources, that are configured to cause a glint of light to reflect from each eyeball of a user, and one or more image sensors 2614, such as inward-facing sensors, that are configured to capture an image of each eyeball of the user. Changes in the glints from the user's eyeballs and/or a location of a user's pupil, as determined from image data gathered using the image sensor(s) 2614, may be used to determine a direction of gaze.

In addition, a location at which gaze lines projected from the user's eyes intersect the external display may be used to determine an object at which the user is gazing (e.g. a displayed virtual object and/or real background object). Gaze detection subsystem 2610 may have any suitable number and arrangement of light sources and image sensors. In some implementations, the gaze detection subsystem 2610 may be omitted.

The display system 2600 may also include additional sensors. For example, display system 2600 may comprise a global positioning system (GPS) subsystem 2616 to allow a location of the display system 2600 to be determined. This may help to identify real-world objects, such as buildings, etc. that may be located in the user's adjoining physical environment.

The display system 2600 may further include one or more motion sensors 2618 (e.g., inertial, multi-axis gyroscopic, or acceleration sensors) to detect movement and position/orientation/pose of a user's head when the user is wearing the system as part of an augmented reality or virtual reality HMD device. Motion data may be used, potentially along with eye-tracking glint data and outward-facing image data, for gaze detection, as well as for image stabilization to help correct for blur in images from the outward-facing image sensor(s) 2606. The use of motion data may allow changes in gaze location to be tracked even if image data from outward-facing image sensor(s) 2606 cannot be resolved.

In addition, motion sensors 2618, as well as microphone(s) 2608 and gaze detection subsystem 2610, also may be employed as user input devices, such that a user may interact with the display system 2600 via gestures of the eye, neck and/or head, as well as via verbal commands in some cases. It may be understood that sensors illustrated in FIGS. 26 and 27 and described in the accompanying text are included for the purpose of example and are not intended to be limiting in any manner, as any other suitable sensors and/or combination of sensors may be utilized to meet the needs of a particular implementation. For example, biometric sensors (e.g., for detecting heart and respiration rates, blood pressure, brain activity, body temperature, etc.) or environmental sensors (e.g., for detecting temperature, humidity, elevation, UV (ultraviolet) light levels, etc.) may be utilized in some implementations.

The display system 2600 can further include a controller 2620 having a logic subsystem 2622 and a data storage subsystem 2624 in communication with the sensors, gaze detection subsystem 2610, display subsystem 2604, and/or other components through a communications subsystem 2626. The communications subsystem 2626 can also facilitate the display system being operated in conjunction with remotely located resources, such as processing, storage, power, data, and services. That is, in some implementations, an HMD device can be operated as part of a system that can distribute resources and capabilities among different components and subsystems.

The storage subsystem 2624 may include instructions stored thereon that are executable by logic subsystem 2622, for example, to receive and interpret inputs from the sensors, to identify location and movements of a user, to identify real objects using surface reconstruction and other techniques, and dim/fade the display based on distance to objects so as to enable the objects to be seen by the user, among other tasks.

The display system 2600 is configured with one or more audio transducers 2628 (e.g., speakers, earphones, etc.) so that audio can be utilized as part of an augmented reality or virtual reality experience. A power management subsystem 2630 may include one or more batteries 2632 and/or protection circuit modules (PCMs) and an associated charger interface 2634 and/or remote power interface for supplying power to components in the display system 2600.

It may be appreciated that the display system 2600 is described for the purpose of example, and thus is not meant to be limiting. It may be further understood that the display device may include additional and/or alternative sensors, cameras, microphones, input devices, output devices, etc. than those shown without departing from the scope of the present arrangement. Additionally, the physical configuration of a display device and its various sensors and subcomponents may take a variety of different forms without departing from the scope of the present arrangement.

Figure 28:
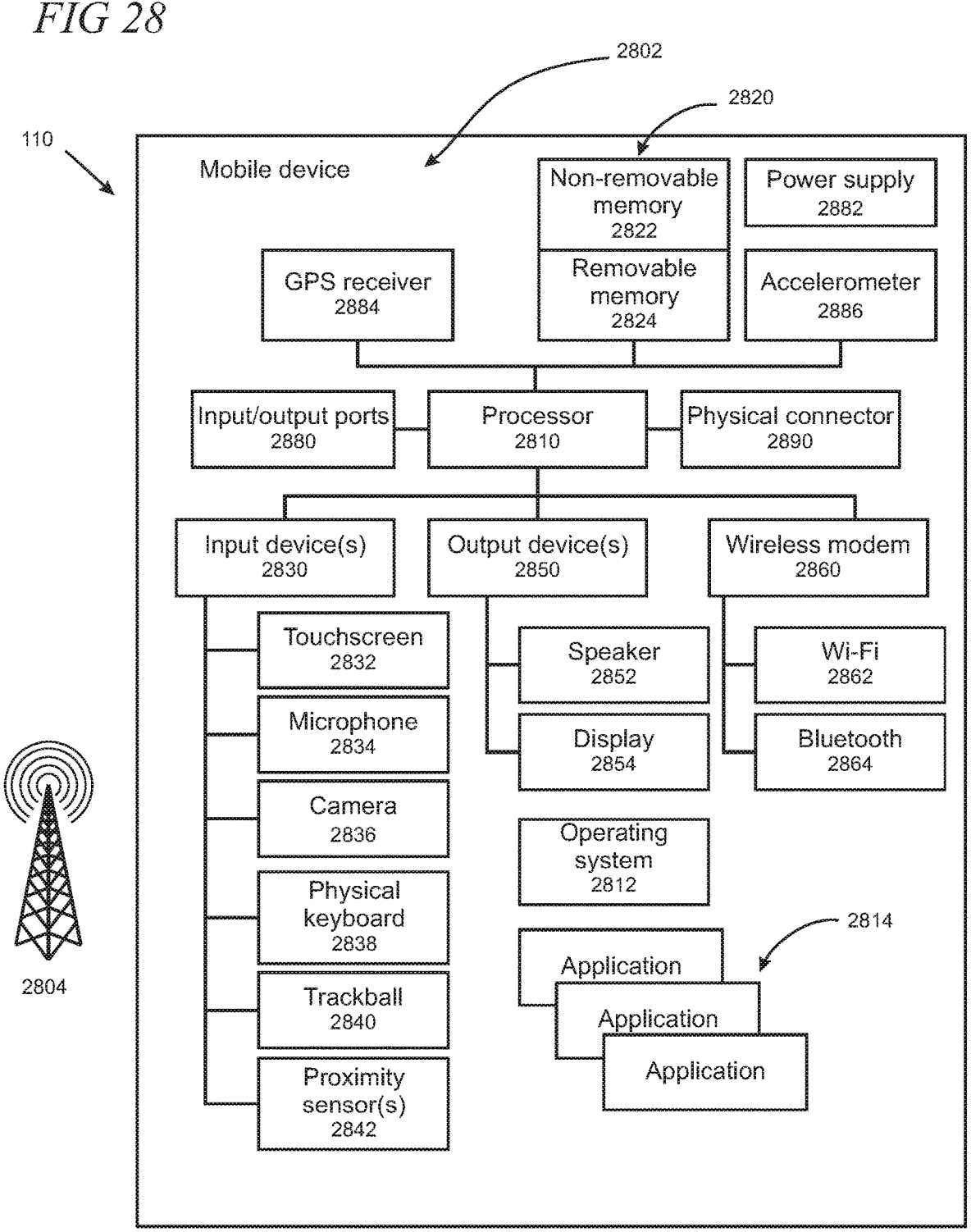
FIG. 28 is a block diagram of an illustrative device such as a mobile phone or smartphone.

FIG. 28 is a functional block diagram of an illustrative device 110 such as a mobile phone or smartphone including a variety of optional hardware and software components, shown generally at 2802. Any component 2802 in the mobile device can communicate with any other component, although, for ease of illustration, not all connections are shown. The mobile device can be any of a variety of computing devices (e.g., cell phone, smartphone, handheld computer, PDA, etc.) and can allow wireless two-way communications with one or more mobile communication networks 2804, such as a cellular or satellite network.

The illustrated device 110 can include a controller or processor 2810 (e.g., signal processor, microprocessor, microcontroller, ASIC (Application Specific Integrated Circuit), or other control and processing logic circuitry) for performing such tasks as signal coding, data processing, input/output processing, power control, and/or other functions. An operating system 2812 can control the allocation and usage of the components 2802, including power states, above-lock states, and below-lock states, and provides support for one or more application programs 2814. The application programs can include common mobile computing applications (e.g., image-capture applications, email applications, calendars, contact managers, web browsers, messaging applications), or any other computing application.

The illustrated device 2800 can include memory 2820. Memory 2820 can include non-removable memory 2822 and/or removable memory 2824. The non-removable memory 2822 can include RAM, ROM, Flash memory, a hard disk, or other well-known memory storage technologies. The removable memory 2824 can include Flash memory or a Subscriber Identity Module (SIM) card, which is well known in GSM (Global System for Mobile communications) systems, or other well-known memory storage technologies, such as "smart cards." The memory 2820 can be used for storing data and/or code for running the operating system 2812 and the application programs 2814. Example data can include web pages, text, images, sound files, video data, or other data sets to be sent to and/or received from one or more network servers or other devices via one or more wired or wireless networks.

The memory 2820 may also be arranged as, or include, one or more computer-readable storage media implemented in any method or technology for storage of information such as computer-readable instructions, data structures, program modules or other data. For example, computer-readable media includes, but is not limited to, RAM, ROM, EPROM, EEPROM, Flash memory or other solid state memory technology, CD-ROM (compact-disc ROM), DVD, (Digital Versatile Disc) HD-DVD (High Definition DVD), Blu-ray, or other optical storage, magnetic cassettes, magnetic tape, magnetic disk storage or other magnetic storage devices, or any other medium which can be used to store the desired information and which can be accessed by the device 110.

The memory 2820 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment. The device 110 can support one or more input devices 2830; such as a touchscreen 2832; microphone 2834 for implementation of voice input for voice recognition, voice commands and the like; camera 2836; physical keyboard 2838; trackball 2840; and/or proximity sensor 2842; and one or more output devices 2850, such as a speaker 2852 and one or more displays 2854. Other input devices (not shown) using gesture recognition may also be utilized in some cases. Other possible output devices (not shown) can include piezoelectric or haptic output devices. Some devices can serve more than one input/output function. For example, touchscreen 2832 and display 2854 can be combined into a single input/output device.

A wireless modem 2860 can be coupled to an antenna (not shown) and can support two-way communications between the processor 2810 and external devices, as is well understood in the art. The modem 2860 is shown generically and can include a cellular modem for communicating with the mobile communication network 2804 and/or other radio-based modems (e.g., Bluetooth® 2864 or Wi-Fi 2862). The wireless modem 2860 is typically configured for communication with one or more cellular networks, such as a GSM network for data and voice communications within a single cellular network, between cellular networks, or between the device and a public switched telephone network (PSTN).

The device can further include at least one input/output port 2880, a power supply 2882, a satellite navigation system receiver 2884, such as a GPS receiver, an accelerometer 2886, a gyroscope (not shown), and/or a physical connector 2890, which can be a USB port, IEEE 1394 (FireWire) port, and/or an RS-232 port. The illustrated components 2802 are not required or all-inclusive, as any components can be deleted and other components can be added.

Figure 29:
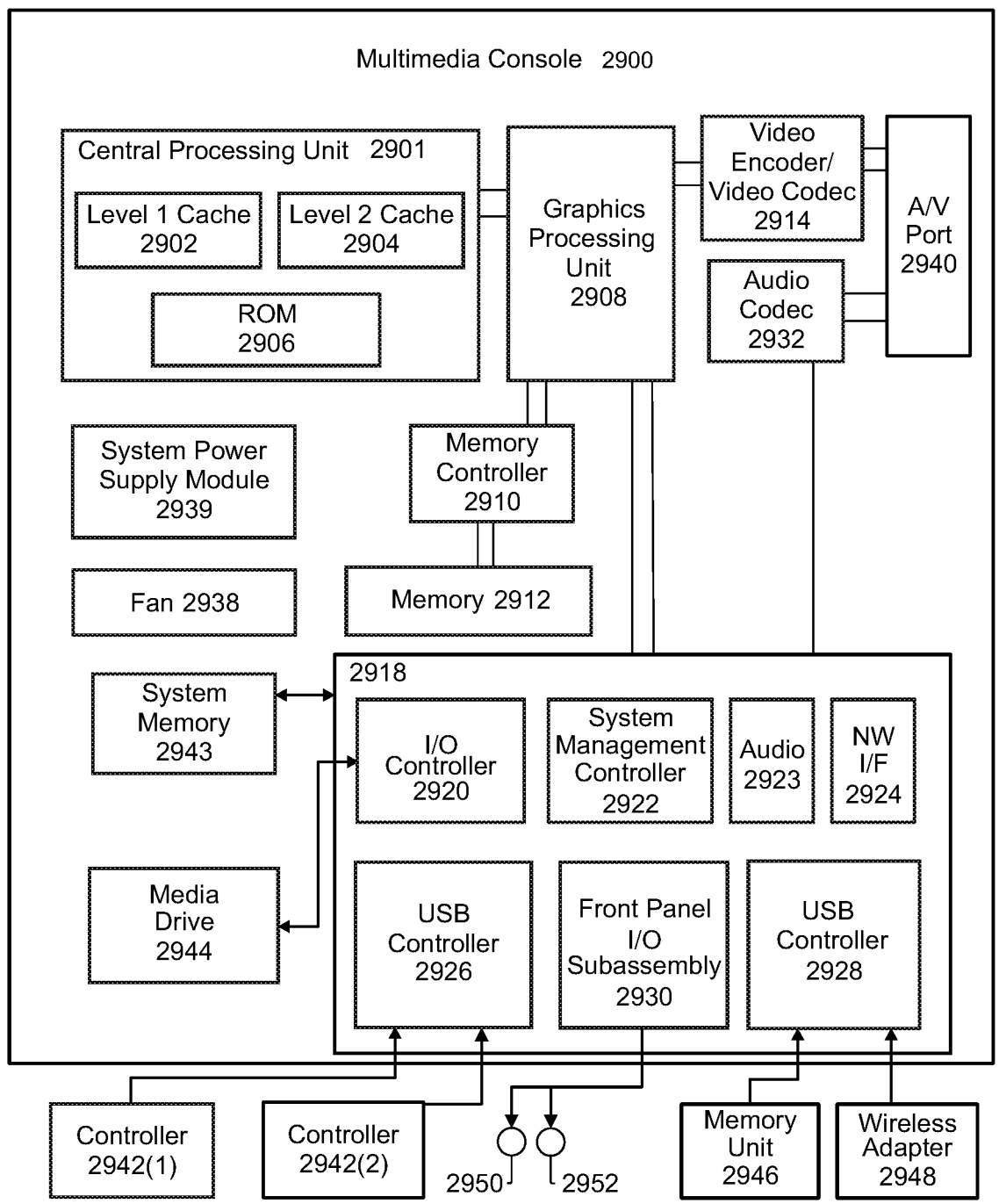
FIG. 29 is a block diagram of an illustrative multimedia console.

FIG. 29 is an illustrative functional block diagram of a multimedia console 2900. The multimedia console 2900 has a central processing unit (CPU) 2901 having a level 1 cache 2902, a level 2 cache 2904, and a Flash ROM (Read Only Memory) 2906. The level 1 cache 2902 and the level 2 cache 2904 temporarily store data and hence reduce the number of memory access cycles, thereby improving processing speed and throughput. The CPU 2901 may be configured with more than one core, and thus, additional level 1 and level 2 caches 2902 and 2904. The Flash ROM 2906 may store executable code that is loaded during an initial phase of a boot process when the multimedia console 2900 is powered ON.

A graphics processing unit (GPU) 2908 and a video encoder/video codec (coder/decoder) 2914 form a video processing pipeline for high speed and high resolution graphics processing. Data is carried from the GPU 2908 to the video encoder/video codec 2914 via a bus. The video processing pipeline outputs data to an A/V (audio/video) port 2940 for transmission to a television or other display. A memory controller 2910 is connected to the GPU 2908 to facilitate processor access to various types of memory 2912, such as, but not limited to, a RAM.

The multimedia console 2900 includes an I/O controller 2920, a system management controller 2922, an audio processing unit 2923, a network interface controller 2924, a first USB (Universal Serial Bus) host controller 2926, a second USB controller 2928, and a front panel I/O subassembly 2930 that are preferably implemented on a module 2918. The USB controllers 2926 and 2928 serve as hosts for peripheral controllers 2942(1) and 2942(2), a wireless adapter 2948, and an external memory device 2946 (e.g., Flash memory, external CD/DVD ROM drive, removable media, etc.). The network interface controller 2924 and/or wireless adapter 2948 provide access to a network (e.g., the Internet, home network, etc.) and may be any of a wide variety of various wired or wireless adapter components including an Ethernet card, a modem, a Bluetooth® module, a cable modem, or the like.

System memory 2943 is provided to store application data that is loaded during the boot process. A media drive 2944 is provided and may comprise a DVD/CD drive, hard drive, or other removable media drive, etc. The media drive 2944 may be internal or external to the multimedia console 2900. Application data may be accessed via the media drive 2944 for execution, playback, etc. by the multimedia console 2900. The media drive 2944 is connected to the I/O controller 2920 via a bus, such as a Serial ATA bus or other high speed connection (e.g., IEEE 1394).

The system management controller 2922 provides a variety of service functions related to assuring availability of the multimedia console 2900. The audio processing unit 2923 and an audio codec 2932 form a corresponding audio processing pipeline with high fidelity and stereo processing. Audio data is carried between the audio processing unit 2923 and the audio codec 2932 via a communication link. The audio processing pipeline outputs data to the A/V port 2940 for reproduction by an external audio player or device having audio capabilities.

The front panel I/O subassembly 2930 supports the functionality of the power button 2950 and the eject button 2952, as well as any LEDs (light emitting diodes) or other indicators exposed on the outer surface of the multimedia console 2900. A system power supply module 2939 provides power to the components of the multimedia console 2900. A fan 2938 cools the circuitry within the multimedia console 2900.

The CPU 2901, GPU 2908, memory controller 2910, and various other components within the multimedia console 2900 are interconnected via one or more buses, including serial and parallel buses, a memory bus, a peripheral bus, and a processor or local bus using any of a variety of bus architectures. By way of example, such architectures can include a Peripheral Component Interconnects (PCI) bus, PCI-Express bus, etc.

When the multimedia console 2900 is powered ON, application data may be loaded from the system memory 2943 into memory 2912 and/or caches 2902 and 2904 and executed on the CPU 2901. The application may present a graphical user interface that provides a consistent user experience when navigating to different media types available on the multimedia console 2900. In operation, applications and/or other media contained within the media drive 2944 may be launched or played from the media drive 2944 to provide additional functionalities to the multimedia console 2900.

The multimedia console 2900 may be operated as a standalone system by simply connecting the system to a television or other display. In this standalone mode, the multimedia console 2900 allows one or more users to interact with the system, watch movies, or listen to music. However, with the integration of broadband connectivity made available through the network interface controller 2924 or the wireless adapter 2948, the multimedia console 2900 may further be operated as a participant in a larger network community.

When the multimedia console 2900 is powered ON, a set amount of hardware resources are reserved for system use by the multimedia console operating system. These resources may include a reservation of memory (e.g., 16 MB), CPU and GPU cycles (e.g., 5%), networking bandwidth (e.g., 8 kbps), etc. Because these resources are reserved at system boot time, the reserved resources do not exist from the application's view.

In particular, the memory reservation preferably is large enough to contain the launch kernel, concurrent system applications, and drivers. The CPU reservation is preferably constant such that if the reserved CPU usage is not used by the system applications, an idle thread will consume any unused cycles.

With regard to the GPU reservation, lightweight messages generated by the system applications (e.g., pop-ups) are displayed by using a GPU interrupt to schedule code to render pop-ups into an overlay. The amount of memory needed for an overlay depends on the overlay area size and the overlay preferably scales with screen resolution. Where a full user interface is used by the concurrent system application, it is preferable to use a resolution independent of application resolution. A scaler may be used to set this resolution such that the need to change frequency and cause a TV re-sync is eliminated.

After the multimedia console 2900 boots and system resources are reserved, concurrent system applications execute to provide system functionalities. The system functionalities are encapsulated in a set of system applications that execute within the reserved system resources described above. The operating system kernel identifies threads that are system application threads versus gaming application threads. The system applications are preferably scheduled to run on the CPU 2901 at predetermined times and intervals in order to provide a consistent system resource view to the application. The scheduling is to minimize cache disruption for the gaming application running on the console.

When a concurrent system application requires audio, audio processing is scheduled asynchronously to the gaming application due to time sensitivity. A multimedia console application manager (described below) controls the gaming application audio level (e.g., mute, attenuate) when system applications are active.

Input devices (e.g., controllers 2942(1) and 2942(2)) are shared by gaming applications and system applications. The input devices are not reserved resources, but are to be switched between system applications and the gaming application such that each will have a focus of the device. The application manager preferably controls the switching of input stream, without knowledge of the gaming application's knowledge and a driver maintains state information regarding focus switches.

Various exemplary embodiments of the present interaction with notifications across devices with a digital assistant are now presented by way of illustration and not as an exhaustive list of all embodiments. An example includes a computing device, comprising: one or more processors; a natural language user interface (UI) configured for natural language interactions with a user of the device; and one or more hardware-based memory devices not consisting of propagated signals storing one or more applications and computer-readable instructions which, when executed by the one or more processors, cause the device to receive notifications collected across a plurality of different computing devices, provide a digital assistant on the computing device, the digital assistant configured to interact with the user through the natural language UI, select one or more notifications from the collected notifications to expose to the user, enable the user to interact with the exposed notifications from the collection using the digital assistant, and operate the digital assistant in response to the user interactions.

In another example, the executed instructions further cause the device to receive an interaction from the user of the digital assistant using a physical interaction with the computing device or a gesture that is detected by the computing device. In another example, the notifications are exposed using a single view of the collected notifications across the plurality of devices. In another example, the executed instructions further cause the device to expose the selected notification using one or more of graphics, audio, text, animation, or combinations thereof. In another example, the executed instructions further cause the device to select notifications by filtering the collected notifications by one or more of priority, device, application, sender, subject matter, type, or context. In another example, the executed instructions further cause the device to group notifications by one or more of priority, device, application, sender, subject matter, type, or context. In another example, the context comprises one or more of time/date, location of the user or device, language, schedule, applications installed on the device, user preferences, user behaviors, user activities, stored contacts, call history, messaging history, browsing history, device type, device capabilities, or communication network type. In another example, the plurality of devices is associated with the user by one or more of account, identity, or sign-in. In another example, the operating includes performing an action on one or more of the notifications, the action comprising one or more of sharing contact information, sharing a stored contact, scheduling a meeting, looking at a user's calendar, scheduling a reminder, making a call, operating a device, playing games, making purchases, taking notes, scheduling an alarm or wake-up reminder, sending a message, checking social media for updates, scraping a website, interacting with a search service, sharing or showing files, sending a link to a website, or sending a link to a resource. In another example, the notification pertains to one or more of message, event, or alert.

A further example includes a computer-implemented method for utilizing a digital assistant operating on a computing device, comprising: configuring the digital assistant for context-awareness and interactions with a user of the computing device using a natural language interface; monitor for notifications that are presented on the computing device; sending one or more of the presented notifications to a remote service for incorporation in a collection along with notifications presented on one or more other computing devices that are associated with the user; presenting the collection of notifications on the computing device in a single view; and enabling the user to interact with the presented collection using the digital assistant.

In another example, the computer-implemented method further comprises configuring notifications in the presented collection to be actionable. In another example, the notifications are generated by an application or a system that operates on the device. In another example, the presentation of the notification collection is invoked by keyword. In another example, the presentation of the notification collection is invoked by user speech received at the natural language interface. In another example, the sent notifications are represented by respective signals comprising content and metadata. In another example, the single view provides a comprehensive presentation of notifications across a plurality of computing devices.

A further example includes one or more hardware-based computer-readable memory devices not consisting of propagated signals storing instructions which, when executed by one or more processors disposed in a computer server, cause the computer server to: receive signals from a plurality of computing devices, each of the signals being respectively associated with one or more notifications that are respectively presented on each the computing devices; store the notifications associated with the received signals in a collection; and send the notifications in the collection to a remote computing device for presentation.

In another example, the signals include notification content and metadata associated with the notification. In another example, the executed instructions further cause the computer server to subject the collection of notifications to one or more of filtering, sorting, grouping, or actioning.

Based on the foregoing, it should be appreciated that technologies for interaction with notification across devices with a digital assistant have been disclosed herein. Although the subject matter presented herein has been described in language specific to computer structural features, methodological and transformative acts, specific computing machinery, and computer-readable storage media, it is to be understood that the invention defined in the appended claims is not necessarily limited to the specific features, acts, or media described herein. Rather, the specific features, acts, and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed:

1. A computing device, comprising:
   one or more processors;
   a natural language user interface (UI) configured for natural language interactions with a user of the computing device; and
   one or more hardware-based memory devices not consisting of propagated signals storing one or more applications and computer-readable instructions which, when executed by the one or more processors, cause the computing device to
   receive notifications collected across a plurality of different computing devices that are each associated with and utilized by the user, and wherein the notifications are directed to the user who utilizes the plurality of different computing devices,
   provide a digital assistant on the computing device, the digital assistant configured to interact with the user through the natural language UI,
   select and group notifications from the collected notifications to expose to the user,
   present the notifications in the group in a single view on the natural language UI of the computing device,
   enable the user to interact with the presented notifications from the collection using the digital assistant, and
   operate the digital assistant in response to the user interactions.

2. The computing device of claim 1 in which the executed instructions further cause the computing device to receive an interaction from the user of the digital assistant using a physical interaction with the computing device or a gesture that is detected by the computing device.

3. The computing device of claim 1 in which the executed instructions further cause the computing device to expose the selected notification using one or more of graphics, audio, text, animation, or combinations thereof.

4. The computing device of claim 1 in which the executed instructions further cause the computing device to select notifications by filtering the collected notifications by one or more of priority, computing device, application, sender, subject matter, type, or context.

5. The computing device of claim 1 in which the executed instructions further cause the computing device to group notifications by one or more of priority, computing device, application, sender, subject matter, type, or context.

6. The computing device of claim 5 in which the context comprises one or more of time/date, location of the user or device, language, schedule, applications installed on the computing device, user preferences, user behaviors, user activities, stored contacts, call history, messaging history, browsing history, device type, device capabilities, or communication network type.

7. The computing device of claim 5 in which the plurality of computing devices is associated with the user by one or more of account, identity, or sign-in.

8. The computing device of claim 1 in which the operating includes performing an action on one or more of the notifications, the action comprising one or more of sharing contact information, sharing a stored contact, scheduling a meeting, looking at a user's calendar, scheduling a reminder, making a call, operating a device, playing games, making purchases, taking notes, scheduling an alarm or wake-up reminder, sending a message, checking social media for updates, scraping a website, interacting with a search service, sharing or showing files, sending a link to a website, or sending a link to a resource.

9. The computing device of claim 1 in which the collected notifications pertain to one or more of message, event, or alert.

10. A computer-implemented method for utilizing a digital assistant operating on a computing device, comprising:
    configuring the digital assistant for context-awareness and interactions with a user of the computing device using a natural language interface;
    monitoring for notifications that are presented on the computing device;
    sending one or more of the presented notifications to a remote service for incorporation in a collection along with notifications presented on one or more other computing devices that are associated with the user;
    presenting the collection of notifications on the computing device in a single view; and
    enabling the user to interact with the presented collection using the digital assistant.

11. The computer-implemented method of claim 10 further comprising configuring notifications in the presented collection to be actionable.

12. The computer-implemented method of claim 10 in which the notifications are generated by an application or a system that operates on the computing device.

13. The computer-implemented method of claim 10 in which the presentation of the notification collection is invoked by keyword.

14. The computer-implemented method of claim 10 in which the presentation of the notification collection is invoked by user speech received at the natural language interface.

15. The computer-implemented method of claim 10 in which the sent notifications are represented by respective signals comprising content and metadata.

16. The computer-implemented method of claim 10 in which the single view provides a comprehensive presentation of notifications across a plurality of computing devices.

17. One or more hardware-based computer-readable memory devices not consisting of propagated signals storing instructions which, when executed by one or more processors disposed in a computer server, cause the computer server to:
    receive signals from a plurality of computing devices, each of the signals being respectively associated with one or more notifications that are respectively presented on each of the plurality of computing devices, wherein the plurality of computing devices are associated with and utilized by a unique user, and wherein the one or more notifications are directed to the unique user who utilizes the plurality of computing devices;

store the notifications associated with the received signals in a collection; and send a group of the notifications from the collection to a remote computing device of the plurality of computing devices for presentation, in which the notifications are configured in a group format for presentation in a single view on the remote computing device.

18. The one or more hardware-based computer-readable memory devices of claim 17 in which the signals include notification content and metadata associated with the notification.

19. The one or more hardware-based computer-readable memory devices of claim 17 in which the executed instructions further cause the computer server to subject the collection of notifications to one or more of filtering, sorting, or actioning.

* * * * *